US009762744B2

(12) United States Patent
Miida et al.

(10) Patent No.: US 9,762,744 B2
(45) Date of Patent: Sep. 12, 2017

(54) CHARGE MANAGEMENT SYSTEM, CHARGE MANAGEMENT METHOD, PROGRAM, PROGRAM PROVIDING SYSTEM, AND MAINTENANCE SYSTEM

(75) Inventors: Tetsuya Miida, Tokyo (JP); Yoichi Kanai, Kanagawa (JP); Yuuta Hamada, Tokyo (JP); Naoki Umehara, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/114,079

(22) PCT Filed: Apr. 26, 2012

(86) PCT No.: PCT/JP2012/061695
§ 371 (c)(1),
(2), (4) Date: Oct. 25, 2013

(87) PCT Pub. No.: WO2012/147994
PCT Pub. Date: Nov. 1, 2012

(65) Prior Publication Data
US 2014/0045455 A1 Feb. 13, 2014

(30) Foreign Application Priority Data

Apr. 28, 2011 (JP) ................................. 2011-101876
Mar. 21, 2012 (JP) ................................. 2012-063517

(51) Int. Cl.
*H04M 11/00* (2006.01)
*H04M 15/00* (2006.01)
(Continued)

(52) U.S. Cl.
CPC ........... *H04M 15/60* (2013.01); *H04M 15/06* (2013.01); *H04M 15/18* (2013.01); *H04M 15/28* (2013.01);
(Continued)

(58) Field of Classification Search
CPC ........ H04M 3/56; H04M 15/28; H04M 15/43; H04M 15/75; H04M 15/752;
(Continued)

(56) References Cited

U.S. PATENT DOCUMENTS 4,481,383 A 11/1984 Madon
4,736,402 A * 4/1988 Landis .................. H04M 3/244
375/220
(Continued)

FOREIGN PATENT DOCUMENTS

CN 101227631 A 7/2008
JP 7-007571 1/1995
(Continued)

OTHER PUBLICATIONS

Extended European Search Report issued Jul. 31, 2014, in European Patent Application No. 12776512.1.
(Continued)

*Primary Examiner* — Charles Shedrick
(74) *Attorney, Agent, or Firm* — Oblon, McClelland, Maier & Neustadt, L.L.P.

(57) ABSTRACT

A charge management system includes a user managing unit configured to manage pieces of user identification information for identifying users and pieces of terminal identification information for identifying transmission terminals, each piece of user identification information being associated with pieces of terminal identification information for identifying transmission terminals used by a user identified by the each piece of identification information; and a calculating unit configured to calculate a participation charge to each of the transmission terminals, bases on a total participation duration in which the each of the transmission terminals has participated in a conversation during a predetermined period, and calculate a total participation charge to each of
(Continued)

the users by summing up the participation charges to transmission terminals specified by the pieces of terminal identification information associated with the each piece of the user identification information.

13 Claims, 18 Drawing Sheets

(51) Int. Cl.
    *H04M 15/28*     (2006.01)
    *H04M 15/06*     (2006.01)
    *H04M 15/18*     (2006.01)
    *H04M 3/56*     (2006.01)

(52) U.S. Cl.
    CPC ........... *H04M 15/43* (2013.01); *H04M 15/44* (2013.01); *H04M 15/75* (2013.01); *H04M 15/752* (2013.01); *H04M 15/765* (2013.01); *H04M 15/77* (2013.01); *H04M 15/771* (2013.01); *H04M 3/56* (2013.01); *H04M 2215/14* (2013.01)

(58) Field of Classification Search
    CPC .. H04M 15/765; H04M 15/771; H04M 3/567; H04M 2215/14; H04M 15/06
    USPC ..... 455/406; 379/202.01, 205.01, 158, 93.21
    See application file for complete search history.

(56) References Cited

U.S. PATENT DOCUMENTS

| | | | |
|---|---|---|---|
| 5,802,156 A | 9/1998 | Felger | |
| 6,023,499 A * | 2/2000 | Mansey | H04M 3/56 379/111 |
| 6,148,068 A * | 11/2000 | Lowery | H04L 12/2856 379/202.01 |
| 6,173,315 B1 * | 1/2001 | Deleeuw | H04M 3/567 709/205 |
| 6,427,008 B1 | 7/2002 | Balaz | |
| 6,445,915 B1 * | 9/2002 | Baiyor | H04M 3/46 379/211.01 |
| 7,058,023 B2 | 6/2006 | Wynn | |
| 7,280,816 B2 * | 10/2007 | Fratti | H04M 3/2218 370/328 |
| 7,457,609 B2 * | 11/2008 | Cai | H04L 41/5054 455/405 |
| 7,698,218 B1 * | 4/2010 | Opaluch | G06Q 20/102 379/114.22 |
| 8,238,537 B2 * | 8/2012 | Gisby | H04M 3/56 379/100.05 |
| 8,374,576 B2 * | 2/2013 | Bedingfield, Sr. | H04L 12/1417 379/114.1 |
| 8,667,570 B2 * | 3/2014 | Bari | G06Q 30/04 726/6 |
| 2001/0026609 A1 * | 10/2001 | Weinstein | G06Q 30/0601 379/93.01 |
| 2002/0136167 A1 * | 9/2002 | Steele | H04L 65/4038 370/260 |
| 2002/0141354 A1 * | 10/2002 | Niiya | H04M 3/56 370/260 |
| 2002/0151321 A1 * | 10/2002 | Winchell | G06Q 30/02 455/519 |
| 2004/0077331 A1 * | 4/2004 | King | H04W 24/00 455/405 |
| 2005/0075106 A1 * | 4/2005 | Jiang | H04M 3/42263 455/432.3 |
| 2005/0084086 A1 * | 4/2005 | Hesse | H04L 12/1818 379/202.01 |
| 2005/0213739 A1 * | 9/2005 | Rodman | H04M 3/567 379/202.01 |
| 2007/0050413 A1 * | 3/2007 | Kominek | G06F 17/30899 |
| 2007/0206507 A1 * | 9/2007 | Reichman | H04L 41/5009 370/252 |
| 2007/0232284 A1 * | 10/2007 | Mason | H04M 3/42195 455/416 |
| 2008/0126230 A1 | 5/2008 | Bellora et al. | |
| 2008/0129816 A1 * | 6/2008 | Mattila | H04L 12/66 348/14.08 |
| 2011/0150201 A1 * | 6/2011 | Haich | H04M 3/56 379/202.01 |
| 2011/0219060 A1 | 9/2011 | Ohwada | |
| 2012/0221702 A1 | 8/2012 | Umehara et al. | |

FOREIGN PATENT DOCUMENTS

| | | |
|---|---|---|
| JP | 7-131558 A | 5/1995 |
| JP | 9-172509 | 6/1997 |
| JP | 2002-109403 A | 4/2002 |
| JP | 2002-152703 A | 5/2002 |
| JP | 2002-218069 A | 8/2002 |
| JP | 2002-290635 A | 10/2002 |
| JP | 2003-514291 | 4/2003 |
| JP | 2003-345896 A | 12/2003 |
| JP | 2005-033394 A | 2/2005 |
| JP | 2005-142764 A | 6/2005 |
| JP | 2005-538646 | 12/2005 |
| JP | 2007-295398 | 11/2007 |
| JP | 2008-502239 A | 1/2008 |
| JP | 2011-205612 | 10/2011 |
| JP | 2012-191598 | 10/2012 |
| WO | 01/33520 A1 | 5/2001 |
| WO | 2004/025914 A2 | 3/2004 |

OTHER PUBLICATIONS

Combined Chinese Office Action and Search Report issued Sep. 2, 2014 in Patent Application No. 201280020362.6 with English Translation.
Office Action mailed Jul. 5, 2016 in Japanese Patent Application No. 2013-165434.
Office Action mailed Apr. 5, 2016 in Japanese Patent Application No. 2012-063517.
Office Action issued Aug. 11, 2016 in Canadian Patent Application No. 2,834,145.
International Search Report issued Aug. 7, 2012 in PCT/JP2012/061695 filed Apr. 26, 2012.

* cited by examiner

FIG.8

| PROCESSING START CONDITION (COMMUNICATION STATUS) | PROCESSED TARGET TABLE | PROCESSED TARGET RECORD | PROCESSING PROCESS CONTENT |
|---|---|---|---|
| COMMUNICATION STATUS="invite" | CONFERENCE LOG MANAGEMENT TABLE (t2) | RECORD WITH SAME CONFERENCE ID | CONFERENCE ID=<u>CONFERENCE ID</u><br>ORGANIZER TERMINAL ID=<br><u>TRANSMISSION SOURCE TERMINAL ID</u> |
| COMMUNICATION STATUS="start" | CONFERENCE LOG MANAGEMENT TABLE (t2) | RECORD WITH SAME CONFERENCE ID | CONFERENCE ID=<u>CONFERENCE ID</u><br>SESSION DATE/TIME=<u>COMMUNICATION DATE/TIME</u><br>CONFERENCE DURATION=END DATE/TIME/COMMUNICATION DATE/TIME |
| COMMUNICATION STATUS="end" | CONFERENCE LOG MANAGEMENT TABLE (t2) | RECORD WITH SAME CONFERENCE ID | CONFERENCE ID=<u>CONFERENCE ID</u><br>SESSION DATE/TIME=<u>COMMUNICATION DATE/TIME</u><br>CONFERENCE DURATION=<u>COMMUNICATION DATE/TIME</u>/START DATE/TIME |
| COMMUNICATION STATUS="join" | PARTICIPANT LOG MANAGEMENT TABLE (t1) | RECORD WITH SAME CONFERENCE SESSION ID | TERMINAL ID=<u>TRANSMISSION SOURCE TERMINAL ID</u><br>CONFERENCE ID=<u>CONFERENCE ID</u><br>CONFERENCE SESSION ID=<u>CONFERENCE SESSION ID</u><br>PARTICIPATION DATE/TIME=<u>COMMUNICATION DATE/TIME</u><br>PARTICIPATION DURATION=(LEAVE DATE/TIME-<u>COMMUNICATION DATE/TIME</u>)<br>LEAVE STATUS="IN CONFERENCE" |
| COMMUNICATION STATUS="leave" | PARTICIPANT LOG MANAGEMENT TABLE (t1) | RECORD WITH SAME CONFERENCE SESSION ID | TERMINAL ID=<u>TRANSMISSION SOURCE TERMINAL ID</u><br>CONFERENCE ID=<u>CONFERENCE ID</u><br>CONFERENCE SESSION ID=<u>CONFERENCE SESSION ID</u><br>PARTICIPATION DATE/TIME=<u>COMMUNICATION DATE/TIME</u><br>PARTICIPATION DURATION = (<u>COMMUNICATION DATE/TIME</u>/PARTICIPATION DATE/TIME)<br>LEAVE STATUS="NORMAL" |
| COMMUNICATION STATUS="offline"<br>CONFERENCE ID!=null<br>CONFERENCE SESSION ID!=null | PARTICIPANT LOG MANAGEMENT TABLE (t1) | RECORD WITH SAME CONFERENCE SESSION ID | TERMINAL ID=<u>TRANSMISSION SOURCE TERMINAL ID</u><br>CONFERENCE ID=<u>CONFERENCE ID</u><br>CONFERENCE SESSION ID=<u>CONFERENCE SESSION ID</u><br>PARTICIPATION DATE/TIME=<u>COMMUNICATION DATE/TIME</u><br>PARTICIPATION DURATION=(<u>COMMUNICATION DATE/TIME</u>/PARTICIPATION DATE/TIME)<br>LEAVE STATUS="FORCED TERMINATION" |
| ... | ... | ... | ... |

*UNDERLINED INDICATES ITEM VALUES OF RAW LOG INFORMATION

FIG.9

| COMMUNI-CATION STATUS | REQUEST SOURCE TERMINAL ID | DESTINA-TION TERMINAL ID | SESSION ID | CONFER-ENCE ID | CONFER-ENCE SESSION ID | COMMUNICATION DATE/TIME |
|---|---|---|---|---|---|---|
| online | 110001 | - | se001 | - | - | 2010-09-01 09:30:00 |
| online | 110002 | - | se002 | - | - | 2010-09-01 09:30:00 |
| online | 110003 | - | se003 | - | - | 2010-09-01 09:30:00 |
| invite | 110001 | 110002 | - | conf001 | - | 2010-09-01 09:59:50 |
| accept | 110002 | 110001 | - | conf001 | - | 2010-09-01 09:59:59 |
| start | 110001 | - | - | conf001 | - | 2010-09-01 10:00:00 |
| join | 110001 | - | - | conf001 | cse001 | 2010-09-01 10:00:00 |
| join | 110002 | - | - | conf001 | cse001 | 2010-09-01 10:00:00 |
| call | 110003 | 110001 | - | conf001 | - | 2010-09-01 10:09:50 |
| accept | 110001 | 110003 | - | conf001 | - | 2010-09-01 10:09:59 |
| join | 110003 | - | - | conf001 | cse003 | 2010-09-01 10:10:00 |
| leave | 110002 | - | - | conf001 | cse002 | 2010-09-01 10:40:00 |
| offline | 110003 | - | se003 | conf001 | cse003 | 2010-09-01 11:30:25 |
| leave | 110001 | - | - | conf001 | cse001 | 2010-09-01 11:30:25 |
| end | 110001 | - | - | conf001 | - | 2010-09-01 11:30:25 |
| offline | 110001 | - | se001 | - | - | 2010-09-01 11:35:00 |
| offline | 110002 | - | se002 | - | - | 2010-09-01 11:40:00 |
| ... | ... | ... | ... | ... | ... | ... |
| online | 110005 | - | se005 | - | - | 2010-09-12 14:20:00 |
| online | 110006 | - | se006 | - | - | 2010-09-12 14:21:00 |
| invite | 110005 | 110006 | - | conf002 | - | 2010-09-12 14:29:50 |
| accept | 110006 | 110005 | - | conf002 | - | 2010-09-12 14:29:55 |
| start | 110005 | - | - | conf002 | - | 2010-09-12 14:30:00 |
| join | 110005 | - | - | conf002 | cse005 | 2010-09-12 14:30:00 |
| ... | ... | ... | ... | ... | ... | ... |

FIG.10A

| LOG ID | TERMINAL ID | CONFERENCE ID | CONFERENCE SESSION ID | PARTICIPATION DATE/TIME | LEAVE DATE/TIME | PARTICIPATION DURATION | LEAVE STATUS |
|---|---|---|---|---|---|---|---|
| 001 | 110001 | conf001 | cse001 | 2010-09-01 10:00:00 | 2010-09-01 11:30:25 | 01:30:25 | LEFT |
| 002 | 110002 | conf001 | cse002 | 2010-09-01 10:00:00 | 2010-09-01 10:40:00 | 00:40:00 | LEFT |
| 003 | 110003 | conf001 | cse003 | 2010-09-01 10:00:00 | 2010-09-01 11:30:25 | 01:20:25 | FORCED TERMINATION |
| 004 | 110005 | conf002 | cse005 | 2010-09-12 14:30:00 | 2010-09-12 15:35:25 | 01:05:25 | LEFT |
| 005 | 110001 | conf002 | cse005 | 2010-09-12 14:30:00 | 2010-09-12 15:40:10 | 01:10:10 | LEFT |
| 006 | 110002 | conf002 | cse005 | 2010-09-12 14:33:35 | - | 01:06:35 | IN CONFERENCE |
| ... | ... | ... | ... | ... | ... | ... | ... |

FIG.10B

| CONFERENCE ID | ORGANIZER TERMINAL ID | CONFERENCE START DATE/TIME | CONFERENCE END DATE/TIME | CONFERENCE DURATION |
|---|---|---|---|---|
| conf001 | 110001 | 2010-09-01 10:00:00 | 2010-09-01 11:30:25 | 01:30:25 |
| conf002 | 110005 | 2010-09-12 14:30:00 | - | - |
| ... | ... | ... | ... | ... |

FIG.12

| CONTRACT NUMBER | USER ID | USER NAME | USER'S ADDRESS | USER'S PHONE NUMBER | USER'S E-MAIL ADDRESS | TERMINAL ID |
|---|---|---|---|---|---|---|
| 20101005-0001 | a123 | AAA | TOKYO... | ... | ... | 11001 |
| | | | | | | 11002 |
| | | | | | | 11003 |
| | | | | | | ... |
| 20110105-0001 | b234 | BBB | OSAKA... | ... | ... | 11011 |
| | | | | | | 11012 |
| | | | | | | 11013 |
| | | | | | | ... |
| 20110110-0001 | c345 | CCC | State of New York... | ... | ... | 11021 |
| | | | | | | 11022 |
| | | | | | | 11023 |
| | | | | | | ... |
| 20110110-0002 | d456 | DDD | Washington,D.C. ... | ... | ... | 11031 |
| | | | | | | 11032 |
| | | | | | | 11033 |
| | | | | | | ... |
| ... | ... | ... | ... | ... | ... | ... |

FIG.15A

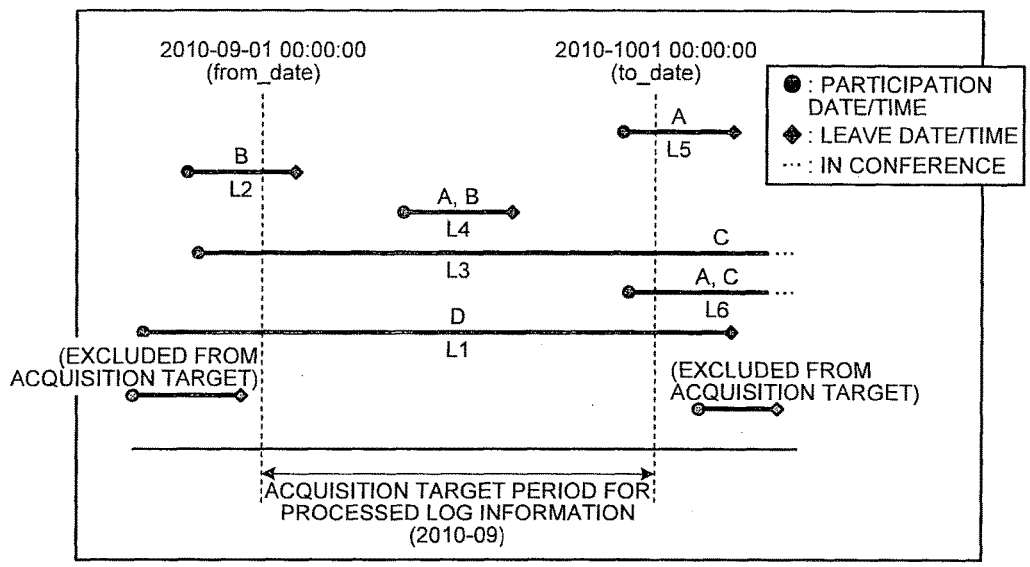

FIG.15B

SEARCH CONDITION A: (TERMINAL ID=TERMINAL ID OF ACQUISITION REQUEST SOURCE TERMINAL) && (from_date≤PARTICIPATION DATE/TIME) && (PARTICIPATION DATE/TIME<to_date)

SEARCH CONDITION B: (TERMINAL ID=TERMINAL ID OF ACQUISITION REQUEST SOURCE TERMINAL) && (from_date≤LEAVE DATE/TIME) && (LEAVE DATE/TIME<to_date)

SEARCH CONDITION C: (TERMINAL ID=TERMINAL ID OF ACQUISITION REQUEST SOURCE TERMINAL) && (LEAVE STATUS="IN CONFERENCE") && (PARTICIPATION DATE/TIME<to_date)

SEARCH CONDITION D: (TERMINAL ID=TERMINAL ID OF ACQUISITION REQUEST SOURCE TERMINAL) && (PARTICIPATION DURATION≤to_date-from_date) && (PARTICIPATION DATE/TIME<from_date) && (LEAVE DATE/TIME<to_date)

FIG.16

TERMINAL SETTING UTILITY SCREEN
1000

1001

TERMINAL ID: 110001    HELP  LOG OUT

MAIN MENU>CONFERENCE LOG

CONFERENCE LOG (2010/09) ~1002    1003

◀ 2010/09 ▼ ▶    1004

| PARTICI-PATION DATE/TIME | LEAVE DATE/TIME | PARTICI-PATION DURATION | ORGA-NIZER TERMINAL ID | CONFER-ENCE START DATE/TIME | CONFER-ENCE END DATE/TIME | CONFER-ENCE DURATION | LEAVE STATUS |
|---|---|---|---|---|---|---|---|
| 2010-09-01 10:00:00 | 2010-09-01 11:30:25 | 01:30:25 | 110001 | 2010-09-01 10:00:00 | 2010-09-01 11:30:25 | 01:30:25 | LEAVE |
| 2010-09-02 15:10:00 | 2010-09-02 15:30:40 | 00:20:40 | 110003 | 2010-09-02 14:50:00 | 2010-09-02 16:50:00 | 02:00:00 | LEAVE |
| 2010-09-05 13:00:00 | 2010-09-05 14:00:00 | 01:00:00 | 110002 | 2010-09-05 13:00:00 | 2010-09-05 14:30:00 | 01:30:00 | FORCED TERMI-NATION |
| 2010-09-12 18:01:10 | 2010-09-12 20:30:45 | 02:29:35 | 110005 | 2010-09-12 18:00:00 | 2010-09-12 20:31:00 | 02:31:00 | LEAVE |

FIG.18

| USER ID | TERMINAL ID | TOTAL PARTICIPATION DURATION PER TERMINAL | PARTICIPATION CHARGE PER TERMINAL | TOTAL PARTICIPATION CHARGE PER USER |
|---|---|---|---|---|
| a123 | 11001 | 21 HOURS 32 MINUTES | 12920 YEN | 45020 YEN |
| | 11002 | 17 HOURS 54 MINUTUS | 10740 YEN | |
| | 11003 | 11 HOURS 10 MINUTES | 6700 YEN | |
| | ... | ... | ... | |
| b234 | 11001 | 14 HOURS 47 MINUTUS | 8870 YEN | 34370 YEN |
| | 11001 | 12 HOURS 35 MINUTUS | 7550 YEN | |
| | 11001 | 11 HOURS 10 MINUTUS | 10750 YEN | |
| | ... | ... | ... | |
| c345 | 11001 | 22 HOURS 03 MINUTUS | 13230 YEN | 38600 YEN |
| | 11001 | 20 HOURS 45 MINUTUS | 12450 YEN | |
| | 11001 | 15 HOURS 15 MINUTUS | 9150 YEN | |
| | ... | ... | ... | |
| d456 | 11001 | 8 HOURS 45 MINUTUS | 5250 YEN | 17820 YEN |
| | 11001 | 16 HOURS 38 MINUTUS | 9980 YEN | |
| | 11001 | 2 HOURS 45 MINUTUS | 1650 YEN | |
| | ... | ... | ... | |
| ... | ... | ... | ... | ... |

FIG.19A

| LOG ID | TERMINAL ID | CONFER-ENCE ID | CONFER-ENCE SESSION ID | PARTICI-PATION DATE/ TIME | LEAVE DATE/ TIME | PARTICI-PATION DURATION | LEAVE STATUS | ERROR FLAG |
|---|---|---|---|---|---|---|---|---|
| 001 | 110001 | conf001 | cse001 | 2010-09-01 10:00:00 | 2010-09-01 11:30:25 | 01:30:25 | LEFT | 1 |
| 002 | 110002 | conf001 | cse002 | 2010-09-01 10:00:00 | 2010-09-01 10:40:00 | 00:40:00 | LEFT | 1 |
| 003 | 110003 | conf001 | cse003 | 2010-09-01 10:00:00 | 2010-09-01 11:30:25 | 01:20:25 | FORCED TERMINATION | 1 |
| 004 | 110005 | conf002 | cse005 | 2010-09-12 14:30:00 | 2010-09-12 15:35:25 | 01:05:25 | LEFT | 1 |
| 005 | 110001 | conf002 | cse005 | 2010-09-12 14:30:00 | 2010-09-12 15:40:10 | 01:10:10 | LEFT | 1 |
| 006 | 110002 | conf002 | cse005 | 2010-09-12 14:33:35 | - | 01:06:35 | IN CONFERENCE | 1 |
| ... | ... | ... | ... | ... | ... | ... | ... | ... |

FIG.19B

| CONFERENCE ID | ORGANIZER TERMINAL ID | CONFERENCE START DATE/ TIME | CONFERENCE END DATE/ TIME | CONFERENCE DURATION | ERROR FLAG |
|---|---|---|---|---|---|
| conf001 | 110001 | 2010-09-01 10:00:00 | 2010-09-01 11:30:25 | 01:30:25 | 1 |
| conf002 | 110005 | 2010-09-12 14:30:00 | - | - | 1 |
| ... | ... | ... | ... | ... | ... |

CHARGE MANAGEMENT SYSTEM, CHARGE MANAGEMENT METHOD, PROGRAM, PROGRAM PROVIDING SYSTEM, AND MAINTENANCE SYSTEM

TECHNICAL FIELD

The present invention relates to a charge management system, a charge management method, program, a program providing system, and a maintenance system.

BACKGROUND ART

In recent years, the number of people who conduct remote conversations by using transmission terminals, such as personal computers (PCs) or mobile phones, is greatly increasing. Furthermore, it is becoming possible to conduct conversations not only between two places (two people) but also among multiple places (three or more people).

An operator who operates a communication service that enables conversations between the transmission terminals makes a profit by charging users of the transmission terminals communication charges. As a method for charging the communication charges, there is a method for uniformly charging all users (participants) who have participated in a conversation the communication charges for a period from start to end of the conversation (see Japanese Patent Application Laid-open No. H9-172509, for example).

However, for example, there is a case that a user using a different transmission terminal joins in a conversation while the conversation is conducted between two places, or that a user who is participating in a conversation by using any transmission terminal leaves the conversation while the conversation is conducted among multiple places. In this case, if the communication charge for a period from start to end of the conversation is uniformly charged to a user who has not participated in the conversation for a certain period of time, the user is unfairly charged.

DISCLOSURE OF INVENTION

According to an embodiment, there is provided A charge management system that includes a user managing unit configured to manage pieces of user identification information for identifying users and pieces of terminal identification information for identifying a plurality of transmission terminals, each piece of user identification information being associated with pieces of terminal identification information for identifying transmission terminals used by a user identified by the each piece of identification information; and a calculating unit configured to calculate a participation charge to each of the transmission terminals, on the basis of a total participation duration in which the each of the transmission terminals has participated in a conversation during a predetermined period, and calculate a total participation charge to each of the users by summing up the participation charges to transmission terminals specified by the pieces of terminal identification information associated with the each piece of the user identification information by referring to the user managing unit.

According to another embodiment, there is provided a charge management method for a charge management system that includes a user managing unit configured to manage pieces of user identification information for identifying users and pieces of terminal identification information for identifying a plurality of transmission terminals, each piece of user identification information being associated with pieces of terminal identification information for identifying transmission terminals used by a user identified by the each piece of identification information. The charge management method includes calculating a participation charge to each of the transmission terminals, on the basis of a total participation duration in which the each of the transmission terminals has participated in a conversation during a predetermined period; and calculating a total participation charge to each of the users by summing up the participation charges to transmission terminals specified by the pieces of terminal identification information associated with the each piece of the user identification information by referring to the user managing unit.

According to still another embodiment, there is provided a program causing a computer to perform the charge management method according to the above embodiment.

According to still another embodiment, there is provided a program providing system for providing the program according to the above embodiment to the charge managing system via a communication network.

According to still another embodiment, there is provided a maintenance system for performing maintenance on the charge management system according to the above embodiment.

BRIEF DESCRIPTION OF DRAWINGS

FIG. 8 illustrates an example of a processing rule management table;

FIG. 9 illustrates an example of raw log information;

FIG. 10A illustrates an example of a participation log management table;

FIG. 10B illustrates an example of a conference log management table;

FIG. 12 illustrates an example of a user management table;

FIG. 15A is a diagram for explaining a target period for acquiring the processed log information;

FIG. 15B is a diagram for explaining search conditions for searching for raw log information;

FIG. 16 illustrates an example of a screen displayed on a display of an external input device;

FIG. 18 is a schematic diagram illustrating sets of participation charges;

FIG. 19A illustrates an example of a participation log management table; and

FIG. 19B illustrates an example of a conference log management table.

BEST MODE(S) FOR CARRYING OUT THE INVENTION

Figure 1:
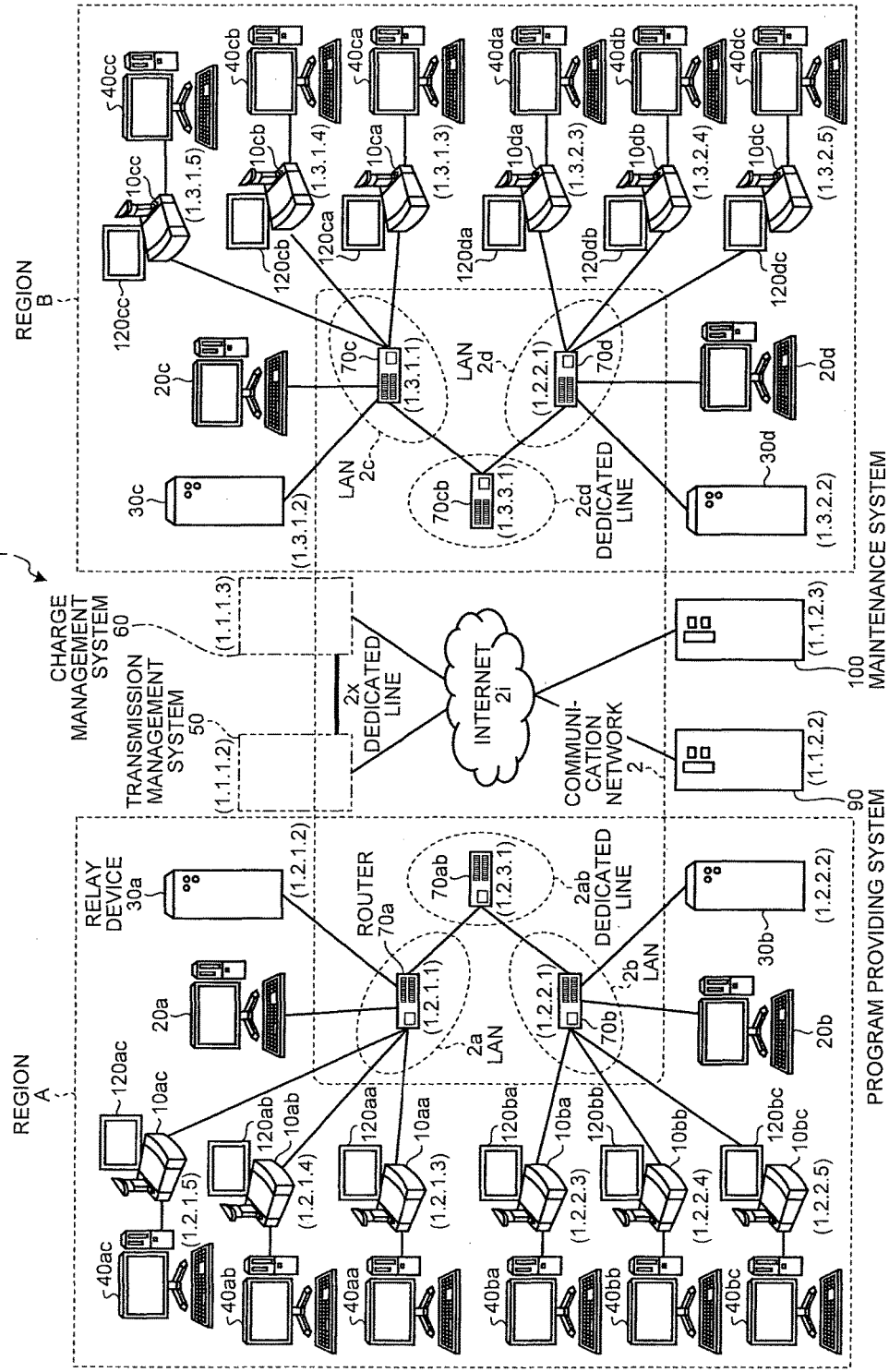
FIG. 1 is a schematic diagram of a transmission system according to an embodiment of the present invention.

Exemplary embodiments of the present invention will be explained below with reference to FIG. 1 to FIG. 19B. FIG. 1 is a schematic diagram of a transmission system according to an embodiment of the present invention.

The transmission system of the embodiment includes a data providing system that unidirectionally transmits contents data from a transmission terminal 10aa or the like to a different transmission terminal 10db or the like via a transmission management system 50.

The transmission system of the embodiment also includes a communication system that bidirectionally communicates information or feelings between a plurality of transmission terminals via the transmission management system 50. The communication system is a system for communicating information or feelings between a communication management system (corresponding to "a transmission management system") and a plurality of communication terminals (corresponding to "transmission terminals"). Examples of the communication system include a teleconference system and a videophone system.

In the embodiments described below, a transmission system, a transmission management system, and a transmission terminal will be explained on the assumption that a teleconference system is an example of the communication system, a teleconference management system is an example of the communication management system, and a teleconference terminal is an example of the communication terminal. The transmission terminal and the transmission management system of the embodiments can be applied not only to the teleconference system, but also to the communication system being the superordinate concept of the teleconference system that enables bidirectional communication or to the transmission system that enables unidirectional communication. A term "teleconference" is used in the embodiments but a term "video conference" is also generally used, and the both terms mean the same thing.

<<Overall Configuration of the Embodiment>>

In the embodiment, a case will be explained that four different business offices, such as a Tokyo office, an Osaka office, a New York office, and a Washington D.C. office, are users of a transmission system 1.

In FIG. 1, terminals or the like in the internal network of a router 70a are managed by the Tokyo office, terminals or the like in the internal network of a router 70b are managed by the Osaka office, terminals or the like in the internal network of a router 70c are managed by the New York office, and terminals or the like in the internal network of a router 70d are managed by the Washington D.C. office.

A plurality of speakers (participants) who use transmission terminals (10aa, 10ab, 10ac, . . . ) when conducting conversations with other transmission terminals belong to the Tokyo office being the user. Examples of the speakers include employees of the user.

One or a plurality of administrators who manage the transmission terminals (10aa, 10ab, 10ac, . . . ) and who use a user terminal 20a for receiving bills for participation charges from a charge management system 60 to be described later belong to the Tokyo office being the user. Similarly, a plurality of speakers and one or a plurality of administrators belong to each of the Osaka office, the New York office, and the Washington D.C. office.

In the embodiment, a communication charge for communication between transmission terminals is charged, and a participation charge for participation of a user of the transmission terminals in conversations using the transmission system 1 is also charged. The communication charge is a packet communication charge charged by a telecommunications company. Recently, there is a price plan that enables unlimited packet communications at a fixed monthly cost. The participation charge is a total charge for participation of each of the speakers in conversations with other speakers using the transmission terminals, and is charged to each of the users by an operator of the transmission system 1. In the embodiment, the participation charge is not charged to each of the speakers of the user or each of the transmission terminals of the user.

Furthermore, in the embodiment, it is assumed that each of the users separately pays the participation charge and the communication charge. The users may be entirely different companies or individuals instead of the different business offices.

The transmission system 1 illustrated in FIG. 1 includes the transmission terminals (10aa, 10ab, . . . ) used by a plurality of speakers; the user terminals (20a, 20b, 20c, 20d) used by a plurality of administrators; displays (120aa, 120ab, . . . ) for the respective transmission terminals (10aa, 10ab, . . . ); external input devices (40aa, 40ab, . . . ) as client personal computers (PC); a plurality of relay devices (30a, 30b, 30c, 30d); the transmission management system 50; the charge management system 60; a program providing system 90; and a maintenance system 100. Each of the terminals 10 receives and transmits image data and video data, which are examples of the contents data.

In the explanation below, any one of the transmission terminals (10aa, 10ab, . . . ) is referred to as "the terminal 10", and any one of the user terminals (20a, 20b, . . . ) is referred to as "a terminal 20". Furthermore, any one of the displays (120aa, 120ab, . . . ) is referred to as "a display 120", any one of the external input devices (40aa, 40ab, . . . ) is referred to as "an external input device 40", and any one of the relay devices (30a, 30b, 30c, 30d) is referred to as "a relay device 30". Moreover, a terminal as a source that issues a request to start a telephone conference is referred to as "a request source terminal", and a terminal as a destination (or a relay destination) that receives a request is referred to as "a destination terminal".

Figure 2:
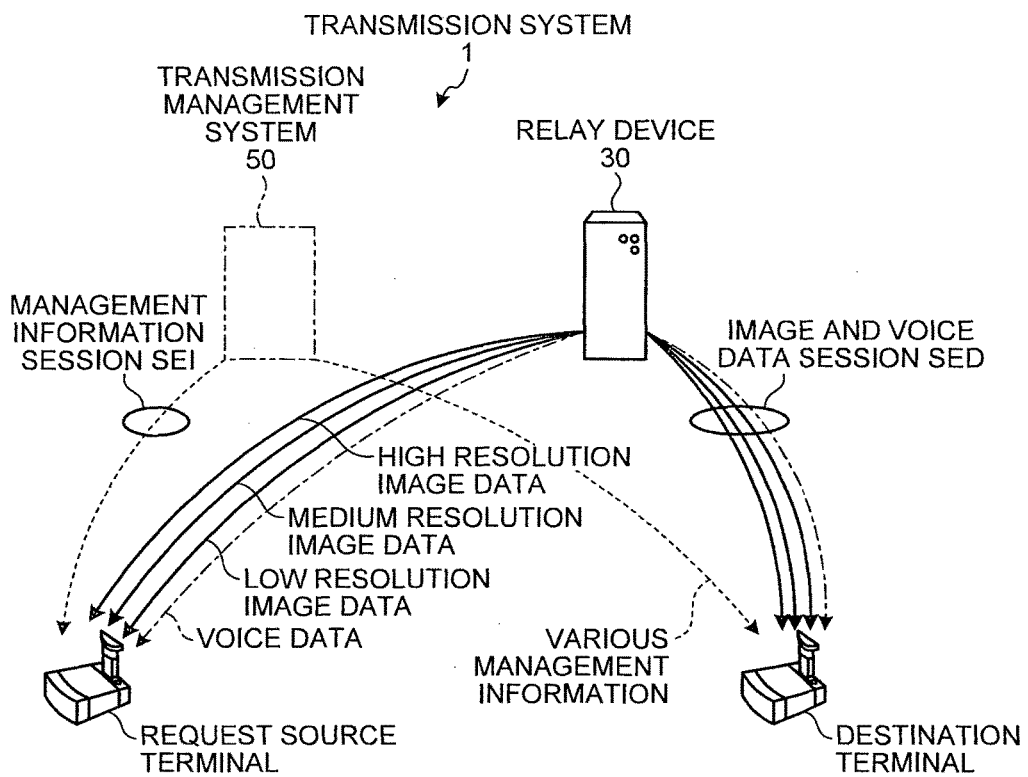
FIG. 2 is a schematic diagram illustrating how image data, voice data, and various types of management information are transmitted and received in the transmission system.

FIG. 2 is a schematic diagram illustrating how image data, voice data, and various types of management information are transmitted and received in the transmission system. As illustrated in FIG. 2, in the transmission system 1, a management information session SEI for transmitting and receiving various types of management information is established between the request source terminal and the destination terminal via the transmission management system 50. Furthermore, four sessions for transmitting and receiving four types of data, such as high-resolution image data, medium-resolution image data, low-resolution image data, and voice data, are established between the request source terminal and the destination terminal via the relay device 30. In the figure, an image and voice data session SED collectively denotes the four sessions.

Figure 3:
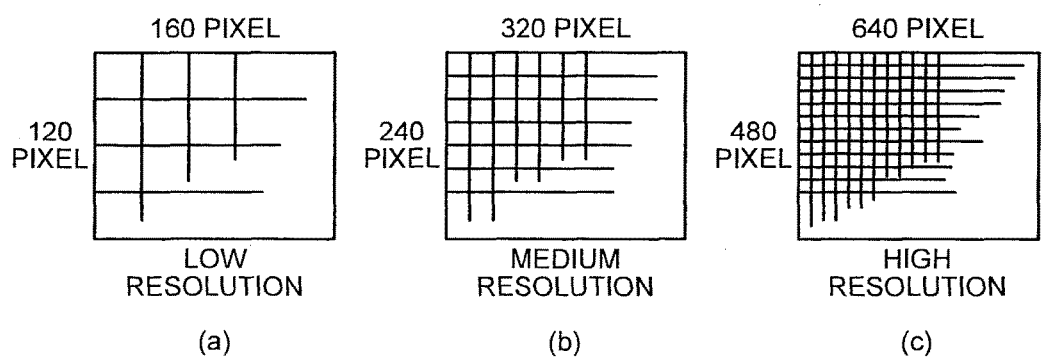
FIG. 3 illustrates image quality of image data.

The resolution of an image of each image data of the embodiment is explained below with reference to FIG. 3. FIG. 3 illustrates the image quality of the image data. As illustrated in (a) of FIG. 3, there is a low-resolution image having 160 pixels wide and 120 pixels high and to be used as a base image. As illustrated in (b) of FIG. 3, there is a medium-resolution image having 320 pixels wide and 240 pixels high. As illustrated in (c) of FIG. 3, there is a high-resolution image having 640 pixels wide and 480 pixels high. When a narrow-bandwidth channel is included in a route, low-quality image data consisting of only the low-resolution image being the base image is relayed. When the bandwidth is relatively wide, the low-resolution image data being the base image and medium-quality image data consisting of the medium-resolution image data are relayed. When the bandwidth is extremely wide, the low-resolution image data being the base image, the medium-resolution image data, and high-quality image data consisting of the high-resolution image data are relayed. The image of the image data may be a moving image or a still image.

The relay device 30 illustrated in FIG. 1 relays the content data between the terminals 10.

The transmission management system 50 manages login authentication for the terminals 10, call statuses of the terminals 10, destination results, communication logs, a communication status of the relay device 30, and the like, in an integrated manner. The transmission management system 50 will be explained in detail later.

The charge management system 60 calculates a participation charge per user and performs charge management to charge each of the users the participation charge. The charge management system 60 will be explained in detail later. It may be possible for the charge management system 60 to calculate the communication charge and perform charge management to charge each of the users the communication charge, in addition to the participation charge.

A plurality of routers (70a, 70b, 70c, 70d, 70ab, 70cd) select an optimal route for the image data or the voice data. Hereinafter, any one of the routers (70a, 70b, 70c, 70d, 70ab, 70cd) is referred to as "a router 70".

The program providing system 90 includes a hard disk (HD) 204 that stores therein a terminal program for causing the terminal 10 to implement various functions (or for causing the terminal 10 to function as various units), which will be described below. The terminal program can be transmitted to the terminal 10. The HD 204 of the program providing system 90 also stores therein a relay device program for causing the relay device 30 to implement various functions (or for causing the relay device 30 to function as various units). The relay device program can be transmitted to the relay device 30.

The HD 204 of the program providing system 90 also stores therein transmission management program for causing the transmission management system 50 to implement various functions (or for causing the transmission management system 50 to function as various units). The transmission management program can be transmitted to the transmission management system 50. The HD 204 of the program providing system 90 also stores therein a charge management program for causing the charge management system 60 to implement various functions (or for causing the charge management system 60 to function as various units). The charge management program can be transmitted to the charge management system 60.

The maintenance system 100 is a computer that maintains, manages, or checks at least one of the terminal 10, the relay device 30, the transmission management system 50, the charge management system 60, and the program providing system 90. For example, when the maintenance system 100 is located in one country and the terminal 10, the relay device 30, the transmission management system 50, the charge management system 60, or the program providing system 90 is located in a different country, the maintenance system 100 remotely maintains, manages, or checks, as maintenance, at least one of the terminal 10, the relay device 30, the transmission management system 50, the charge management system 60, and the program providing system 90 via a communication network 2. The maintenance system 100 manages, as maintenance, a model number, a manufacturing number, a sales destination, a check status, or a failure log of at least one of the terminal 10, the relay device 30, the transmission management system 50, the charge management system 60, and the program providing system 90, without using the communication network 2.

Meanwhile, the terminals (10aa, 10ab, . . . ), the relay device 30a, and the router 70a are communicably connected to one another via a LAN 2a. The external input devices (40aa, 40ab, . . . ) are communicably connected to the terminals (10aa, 10ab, . . . ), respectively. The terminals (10ba, 10bb, . . . ), the relay device 30b, and the router 70b are communicably connected to one another via a LAN 2b. The external input devices (40ba, 40bb, . . . ) are communicably connected to the terminals (10ba, 10bb, . . . ), respectively. The LAN 2a and the LAN 2b are communicably connected to each other through a dedicated line 2ab via a router 70ab and are installed in a predetermined region A. For example, the region A is Japan, the LAN 2a is installed in the Tokyo office, and the LAN 2b is installed in the Osaka office as described above.

The terminals (10ca, 10cb, . . . ), the relay device 30c, and the router 70c are communicably connected to one another via a LAN 2c. The external input devices (40ca, 40cb, . . . ) are communicably connected to the terminals (10ca, 10cb, . . . ), respectively. The terminals (10da, 10db, . . . ), the relay device 30d, and the router 70d are communicably connected to one another via a LAN 2d. The external input devices (40da, 40db, . . . ) are communicably connected to the terminals (10da, 10db, . . . ), respectively. The LAN 2c and the LAN 2d are communicably connected to each other through a dedicated line 2cd via a router 70cd and are installed in a predetermined region B. For example, the region B is the United States of America, the LAN 2c is installed in the New York office, and the LAN 2d is installed in the Washington D.C. office as described above. Furthermore, the transmission management system 50 and the charge management system 60 are communicably connected to each other through a dedicated line 2x.

The transmission management system 50, the charge management system 60, the program providing system 90, and the maintenance system 100 are communicably connected to the terminal 10 and the relay device 30 via the Internet 2i. The transmission management system 50, the charge management system 60, the program providing system 90, and the maintenance system 100 may be installed in the region A, the region B, or any other region.

In the embodiment, the communication network 2 includes the LAN 2a, the LAN 2b, the dedicated line 2ab, the Internet 2i, the dedicated line 2cd, the dedicated line 2x, the LAN 2c, and the LAN 2d. In a part of the communication network 2, not only a wire communication but also a wireless communication using Wireless Fidelity (WiFi) or Bluetooth (registered trademark) may be available.

In FIG. 1, a combination of four numbers shown at each of the terminal 10, the relay device 30, the transmission management system 50, the charge management system 60, the router 70, the program providing system 90, and the maintenance system 100 is a simplified IP address for general IPv4. A combination of four numbers shown at the charge management system 60 is a simplified IPv4 IP address of a communication management server 510. For example, the IP address of the terminal 10aa is "1.2.1.3". Ipv6 may be used instead of IPv4; however, IPv4 will be used in the explanation below for simplicity.

The terminals 10 may be used to make a call in the same room, between indoor and outdoor locations, or in an outdoor location, in addition to a call between a plurality of business offices or between different rooms in the same business office. When the terminals 10 are used in an outdoor location, a wireless communication using a mobile phone communication network or the like is performed.

<<Hardware Configuration of the Embodiment>>

Figure 4:
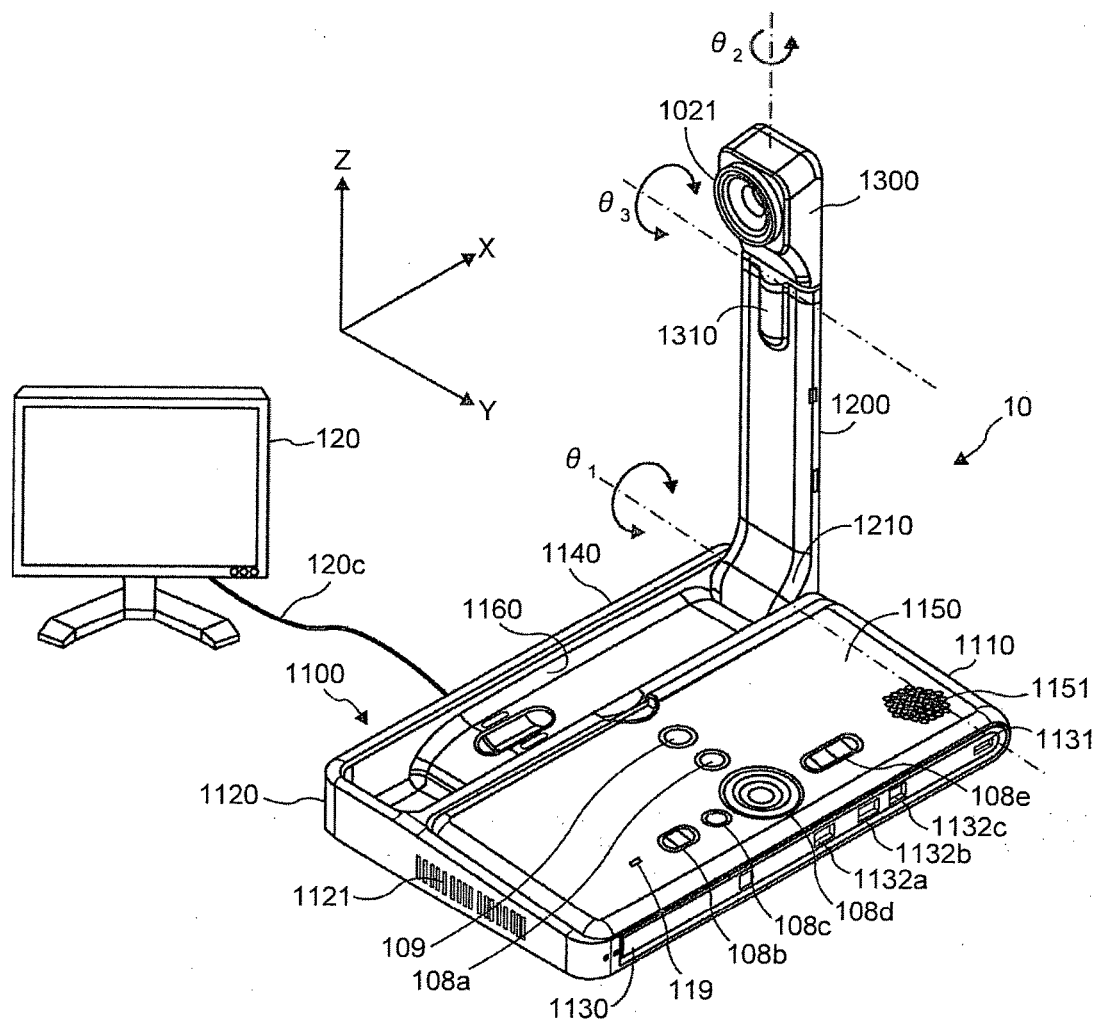
FIG. 4 is an external view of a transmission terminal according to the embodiment.

A hardware configuration of the embodiment will be explained. FIG. 4 is an external view of the terminal 10 according to the embodiment. In the explanation below, it is assumed that the longitudinal direction of the terminal 10 is the X-axis direction, a direction orthogonal to the X-axis direction within the horizontal plane is the Y-axis direction, and a direction (a vertical direction) orthogonal to the X-axis direction and the Y-axis direction is the Z-axis direction.

As illustrated in FIG. 4, the terminal 10 includes a housing 1100, an arm 1200, and a camera housing 1300. An air inlet surface (not illustrated) including a plurality of air inlet holes is formed on a front wall 1110 of the housing 1100, and an air outlet surface 1121 including a plurality of air outlet holes is formed on a rear wall 1120 of the housing 1100. Therefore, by driving a cooling fan disposed inside the housing 1100, it is possible to introduce air behind the terminal 10 through the air inlet surface (not illustrated) and discharge air to the outside of the terminal 10 through the air outlet surface 1121. A sound pickup hole 1131 is formed on a right wall 1130 of the housing 1100, so that a built-in microphone 114 (to be described later) can pick up sound, such as voice, tone, or noise.

An operating panel 1150 is disposed on the right wall 1130 side of the housing 1100. The operating panel 1150 includes a plurality of operation buttons (108a to 108e), power switch 109, and an alarm lamp 119, which will be explained later, and also includes a sound output surface 1151 including a plurality of sound output holes for conveying sound output from a built-in speaker 115, which will be explained later. A housing portion 1160 as a concave portion for housing the arm 1200 and the camera housing 1300 are formed on a left wall 1140 side of the housing 1100. A plurality of connection ports (1132a to 1132c) for electrically connecting a cable to an external-device connection I/F 118 are disposed on the right wall 1130 of the housing 1100. A connection port (not illustrated) for electrically connecting a cable 120c of the display 120 to the external-device connection I/F 118 is disposed on the left wall 1140 of the housing 1100.

In the explanation below, any one of the operation buttons (108a to 108e) is referred to as "an operation button 108" and any one of the connection ports (1132a to 1132c) is referred to as "a connection port 1132".

The arm 1200 is attached to the housing 1100 via a torque hinge 1210 such that the arm 1200 can rotate in the vertical direction within a tilt angle $\theta_1$ of 135°. FIG. 4 illustrates a state in which the tilt angle $\theta_1$ is 90°. A built-in camera 1021 (corresponding to a camera 112 described later) is installed in the camera housing 1300 to capture an image of a user, a document, a room, or the like. A torque hinge 1310 is formed on the camera housing 1300. The camera housing 1300 is attached to the arm 1200 via the torque hinge 1310. The camera housing 1300 is attached to the arm 1200 via the torque hinge 1310 and is rotatable in the vertical and the horizontal directions within a pan angle $\theta_2$ of ±180° on the assumption that the pan angle is 0° in the state illustrated in FIG. 4, and within a tilt angle $\theta_3$ of ±45°.

Each of systems of the terminal 20, the relay device 30 and the transmission management system 50, systems of the charge management system 60, the program providing system 90, and the maintenance system 100 have the same appearances as a general server or computer; therefore, the explanation thereof is omitted.

Figure 5:
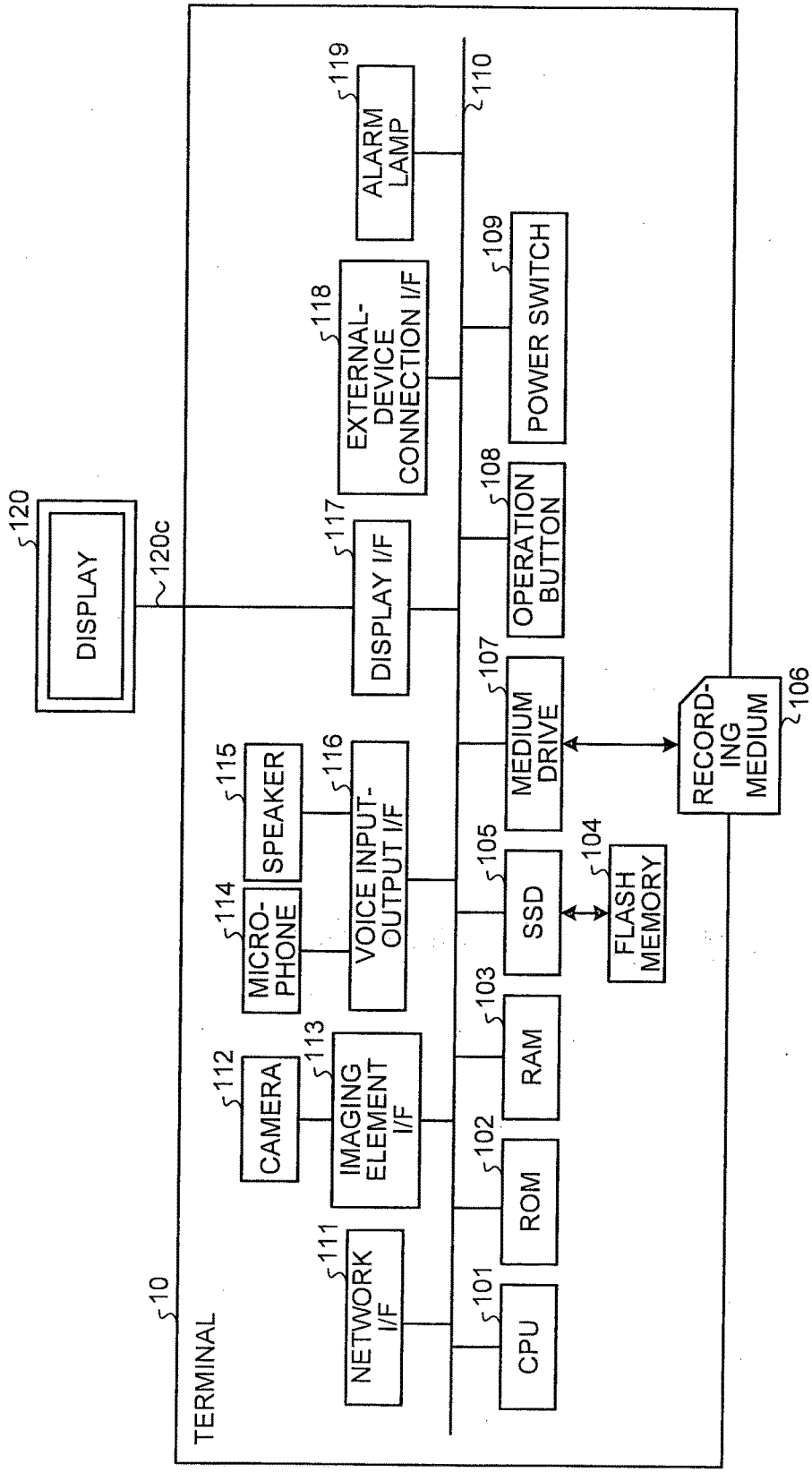
FIG. 5 is a hardware configuration diagram of the transmission terminal according to the embodiment.

FIG. 5 is a hardware configuration diagram of the terminal 10 according to the embodiment. As illustrated in FIG. 5, the terminal 10 of the embodiment includes a central processing unit (CPU) 101 that controls the whole operations of the terminal 10; a read only memory (ROM) 102 that stores therein a program, such as an initial program loader (IPL), used for driving the CPU 101; a random access memory (RAM) 103 used as a working area of the CPU 101; a flash memory 104 that stores therein the terminal program or various types of data, such as image data or voice data; a solid state drive (SSD) 105 that controls read and write of various types of data from and to the flash memory 104 under the control of the CPU 101; a medium drive 107 that controls read and write (storage) of data from and to a recording medium 106, such as a flash memory; the operation button 108 to be operated when a destination from the terminal 10 is selected; the power switch 109 for switching ON or OFF of a power of the terminal 10; and a network interface (I/F) 111 that transmits data by using the communication network 2.

The terminal 10 also includes the built-in camera 112 that captures an image of a subject and obtains image data of the image under the control of the CPU 101; an imaging element I/F 113 that controls operation of the camera 112; the built-in microphone 114 for inputting voice; the built-in speaker 115 for outputting voice; a voice input-output I/F 116 that performs an input-output process on a voice signal between the microphone 114 and the speaker 115 under the control of the CPU 101; a display I/F 117 that transmits image data to the external display 120 under the control of the CPU 101; the external-device connection I/F 118 for connecting various external devices; the alarm lamp 119 for notifying that there is a failure in various functions of the terminal 10; and a bus line 110, such as an address bus or a data bus, for electrically connecting the above components as illustrated in FIG. 5.

The display 120 is a display unit made with liquid crystal or organic electroluminescent (EL) for displaying an image of a subject, an operation icon, or the like. The display 120 is connected to the display I/F 117 via the cable 120c. The cable 120c may be a cable for an analog RGB (VGA) signal, may be a cable for component video, or may be a cable for a high-definition multimedia interface (HDMI) signal or a digital video interactive (DVI) signal.

The camera 112 includes a solid-state imaging device that converts light to electrical charges in order to computerize an image (video) of a subject. A complementary metal oxide semiconductor (CMOS) or a charge coupled device (CCD) may be used as the solid-state imaging device.

To the external-device connection I/F 118, an external device, such as an external camera, an external microphone, or an external speaker, is electrically connectable via a universal serial bus (USB) cable inserted into the connection port 1132 of the housing 1100 illustrated in FIG. 4. When the external camera is connected, the external camera is activated in priority to the built-in camera 112 under the control of the CPU 101. Similarly, when the external microphone or the external speaker is connected, the external microphone or the external speaker is activated in priority to the built-in microphone 114 or the built-in speaker 115 under the control of the CPU 101.

The recording medium 106 is detachably attached to the terminal 10. Any nonvolatile memory that can read and write data under the control of the CPU 101 may be used instead of the flash memory. For example, an electrically erasable and programmable ROM (EEPROM) may be used.

The terminal program may be distributed by being recorded in a computer-readable recording medium (such as the recording medium 106) in a computer-installable or a computer-executable file format. The terminal program may be stored in the ROM 102 instead of the flash memory 104.

Figure 6:
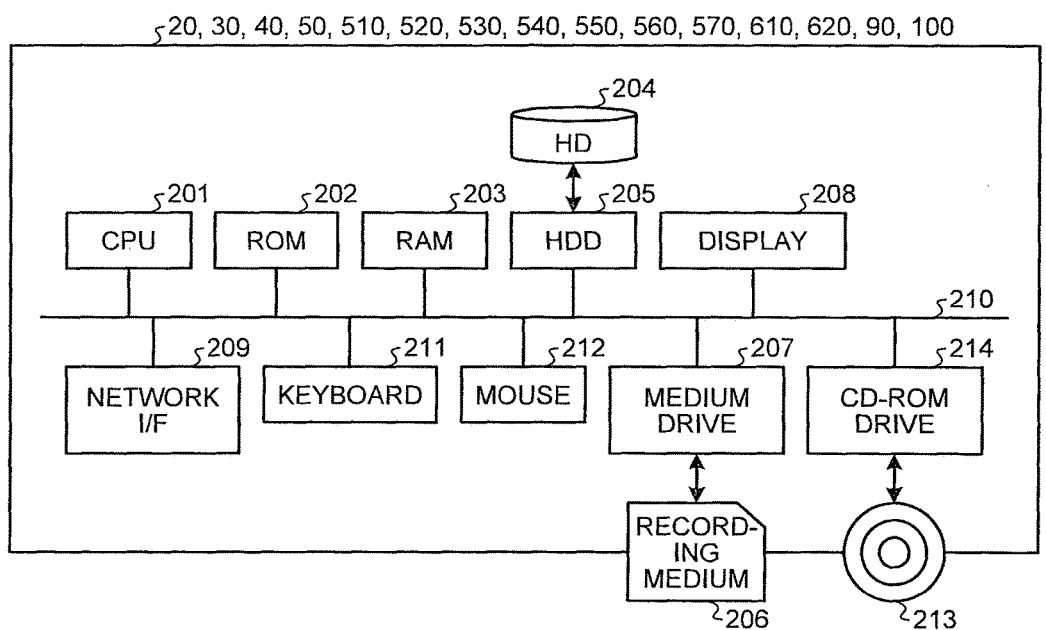
FIG. 6 is a hardware configuration diagram of a transmission management system, a relay device, a program providing server, or a maintenance system according to the embodiment.

FIG. 6 is a hardware configuration diagram of the transmission management system according to the embodiment of the present invention. The transmission management system 50 includes a CPU 201 that controls the whole operations of the transmission management system 50; a ROM 202 that stores therein a program, such as an IPL, used for driving the CPU 201; a RAM 203 used as a working area of the CPU 201; the HD 204 that stores therein various types of data, such as the transmission management program; a hard disk drive (HDD) 205 that controls read and write of various types of data from and to the HD 204 under the control of the CPU 201; a medium drive 207 that controls read and write (storage) of data from and to a recording medium 206, such as a flash memory; a display 208 that displays various types of information, such as a cursor, a menu, an window, a character, or an image; a network I/F 209 that transmits data by using the communication network 2; a keyboard 211 that includes a plurality of keys for inputting a character, a numeral, or various instructions; a mouse 212 for selecting or executing various instructions, selecting a processing object, or moving a cursor; a CD-ROM drive 214 that controls read and write of various types of data from and to a compact disc read only memory (CD-ROM) 213 that is an example of a removable recording medium; and a bus line 210, such as an address bus or a data bus, for electrically connecting the above components as illustrated in FIG. 6.

The transmission management program may be distributed by being recorded in a computer-readable recording medium, such as the recording medium 206 or the CD-ROM 213, in a computer-installable or a computer-executable file format. The transmission management program may be stored in the ROM 202 instead of the HD 204.

The relay device 30 has the same hardware configuration as that of the transmission management system 50; therefore, the explanation thereof is omitted. However, the HD 204 stores therein the relay device program for controlling the relay device 30. In this case, the relay device program may be distributed by being recorded in a computer-readable recording medium, such as the recording medium 206 or the CD-ROM 213, in a computer-installable or a computer-executable file format. The relay device program may be stored in the ROM 202 instead of the HD 204.

The external input device 40 has the same hardware configuration as that of the transmission management system 50; therefore, the explanation thereof is omitted. However, the HD 204 stores therein an external-input-device program for controlling the external input device 40. In this case, the external-input-device program may be distributed by being recorded in a computer-readable recording medium, such as the recording medium 206 or the CD-ROM 213, in a computer-installable or a computer-executable file format. The external-input-device program may be stored in the ROM 202 instead of the HD 204.

The program providing system 90 has the same hardware configuration as that of the transmission management system 50; therefore, the explanation thereof is omitted. However, the HD 204 stores therein a program-providing-system program for controlling the program providing system 90. In this case, the program-providing-system program may be distributed by being recorded in a computer-readable recording medium, such as the recording medium 206 or the CD-ROM 213, in a computer-installable or a computer-executable file format. The program-providing-system program may be stored in the ROM 202 instead of the HD 204.

The maintenance system 100 has the same hardware configuration as that of the transmission management system 50; therefore, the explanation thereof is omitted. However, the HD 204 stores therein a maintenance program for controlling the maintenance system 100. In this case, the maintenance program may be distributed by being recorded in a computer-readable recording medium, such as the recording medium 206 or the CD-ROM 213, in a computer-installable or a computer-executable file format. The maintenance program may be stored in the ROM 202 instead of the HD 204.

It may be possible to provide the programs by recording the programs in a computer-readable recording medium, such as a compact disc recordable (CD-R) or a digital versatile disk (DVD), as another example of the detachable recording medium described above.

<<Functional Configuration of the Embodiment>>

A functional configuration of each of the transmission management system 50 and the charge management system 60 will be explained below. An explanation of the functions of the terminal 10, the relay device 30, the external input device 40, the router 70, the program providing system 90, and the maintenance system 100 will be omitted.

<<Transmission Management System>>

Figure 7:
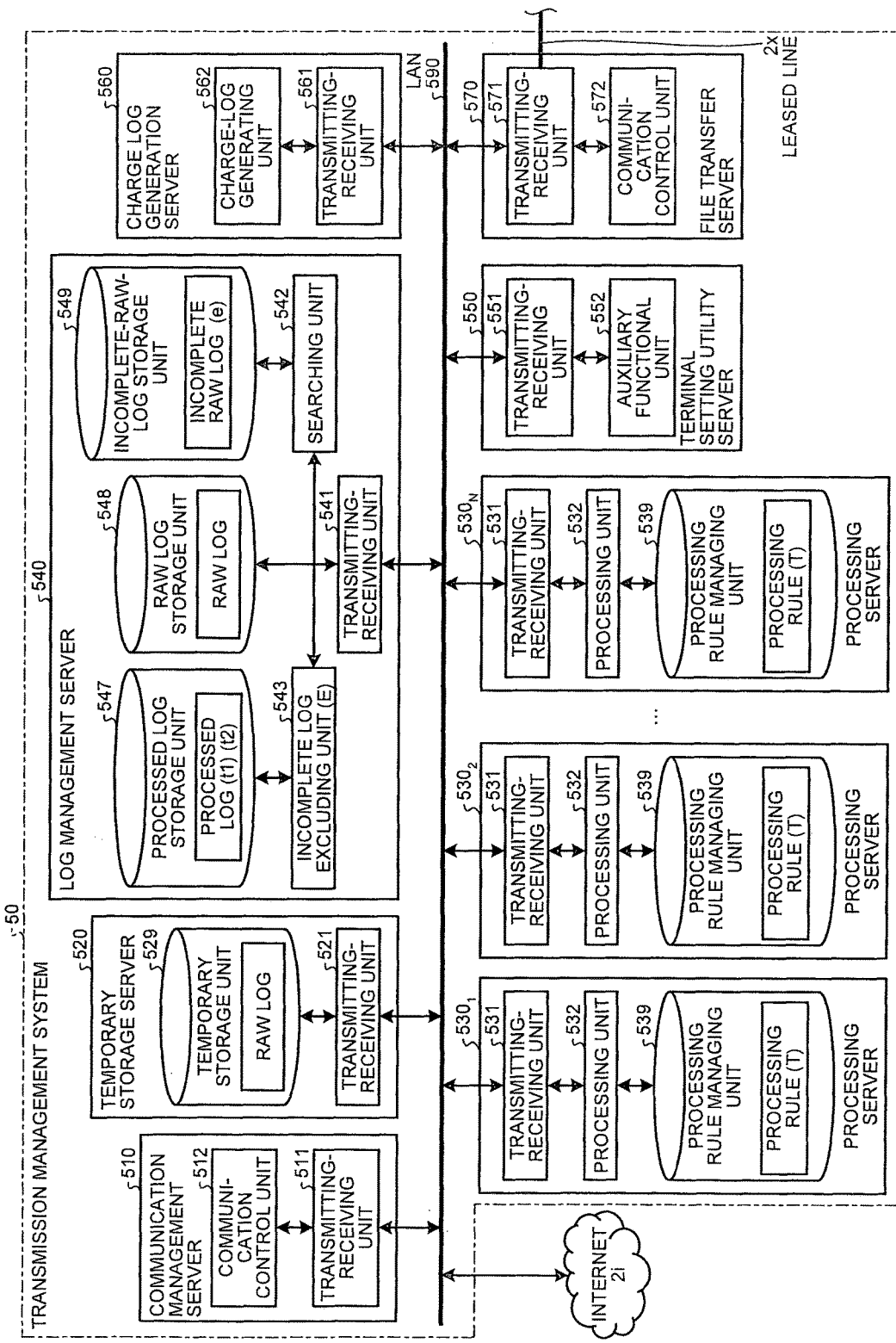
FIG. 7 is a functional block diagram of the transmission management system according to the embodiment.

FIG. 7 is a functional block diagram of the transmission management system 50 of the embodiment. As illustrated in FIG. 7, the transmission management system 50 includes the communication management server 510; a temporary storage server 520; a plurality of processing servers ($530_1$, $530_2$, ... $530_N$) (N is a positive number); a log management server 540; a terminal setting utility server 550; a charge log generation server 560; and a file transfer server 570. All the servers are connected to one another via a LAN 590 and are connected to the Internet 2$i$ via the LAN 590.

Each of the servers included in the transmission management system 50 has the same hardware configuration as that of the transmission management system 50; therefore the explanation thereof is omitted. Any one of the processing serves ($530_1$, $530_2$, ... $530_N$) is referred to as "a processing server 530". The file transfer server 570 is also connected to the dedicated line 2$x$.

Communication Management Server

Characteristic functions of the communication management server 510 will be explained below. The communication management server 510 includes a transmitting-receiving unit 511 and a communication control unit 512.

The transmitting-receiving unit 511 is a function or a means implemented by a command from the CPU 201 illustrated in FIG. 6 or by the network I/F 209 illustrated in FIG. 6. The transmitting-receiving unit 511 transmits and receives various types of data (or information) to and from other terminals, devices, servers, or systems via the communication network 2 including the LAN 590 and the Internet 2*i*. For example, the transmitting-receiving unit 511 receives raw log information indicating a log of communications performed by each of the terminals 10, from each of the terminals 10 via the Internet 2*i* and the LAN 590.

The raw log information is information indicating a log of the communication status of each of the terminals 10, and is raw log information before being processed as described later. FIG. 9 illustrates an example of a raw log information group. Each piece of raw log information is shown in each record of a schema illustrated in FIG. 9. The raw log information contains attributes including a communication status, a request source terminal ID, a destination terminal ID, a session ID, a conference ID, a conference session ID, and a communication date/time.

Among the attributes, the attribute "communication status" indicates a type of communication performed by the terminal 10. Among the communication statuses, the communication status "online" indicates that the terminal 10 is powered on. The communication status "offline" indicates that the terminal 10 is powered off (if the status enters offline during a conference, values are also stored in the conference ID and the conference session ID). The communication status "invite" indicates a request for invitation to a conference. The communication status "call" indicates a request for participation in a conference. The communication status "accept" indicates approval of the request for invitation (invite) or the request for participation (call). The communication status "start" indicates the start of a conference. The communication status "end" indicates the end of a conference. The communication status "join" indicates that the terminal 10 participates in a conference. The communication status "leave" indicates that the terminal 10 leaves a conference.

The attribute "request source terminal ID" indicates, as an example of request source terminal identification information, an identification (ID) for identifying a request source terminal. The attribute "destination terminal ID" indicates, as an example of destination terminal identification information, an ID for identifying a destination terminal. The attribute "session ID" is an ID for identifying a session from online till offline. The attribute "conference ID" is an ID for identifying a conference. The attribute "conference session ID" is an ID for identifying a conference session from when the terminal 10 participates in a conference to when the terminal 10 leaves the conference. For example, when the terminal repeatedly participates in and leaves the same conference at different times, a different value is assigned to each conference ID. The attribute "communication date/time" indicates date and time at which the terminal 10 performs the communication in the above communication status.

The above attributes and communication statuses are examples; therefore, data items or values other than the above may be included. In this example, each of the attributes is explicitly defined similarly to a DB table; however, the raw log information may contain various items. For example, it may be possible to contain only text data item, such as JavaScript object notation (JSON) or extensible markup language (XML).

The communication control unit 512 is a function or a means implemented by a command from the CPU 201 illustrated in FIG. 6, and controls communication between the transmitting-receiving unit 511 and each of the terminals 10 through the management information session SEI illustrated in FIG. 2. For example, the communication control unit 512 controls and manages communication with each of the terminals 10, controls and manages reception of the raw log information from each of the terminals 10, and controls and manages transmission of processed log information, which will be described later, to the terminal 10 that has issued an acquisition request for the processed log information.

Temporary Storage Server

Characteristic functions of the temporary storage server 520 will be explained below. The temporary storage server 520 includes a transmitting-receiving unit 521 and a temporary storage unit 529.

The transmitting-receiving unit 521 is a function or a means implemented by a command from the CPU 201 illustrated in FIG. 6 or by the network I/F 209 illustrated in FIG. 6. The transmitting-receiving unit 521 transmits and receives various types of data (or information) to and from other servers via the LAN 590. For example, the transmitting-receiving unit 521 receives raw log information indicating a log of communications performed by each of the terminals 10 from the transmitting-receiving unit 511 of the communication management server 510 via the LAN 590.

The transmitting-receiving unit 521 transmits the raw log information stored in the temporary storage unit 529 to the processing server 530 via the LAN 590. The transmitting-receiving unit 521 receives the raw log information returned from the processing server 530.

The temporary storage unit 529 includes the HD 204 and the HDD 205 illustrated in FIG. 6. The temporary storage unit 529 temporarily stores therein the raw log information received by the transmitting-receiving unit 511 and outputs the stored raw log information to the transmitting-receiving unit 521.

Processing Server

Characteristic functions of the processing server 530 will be explained below. FIG. 8 illustrates an example of a processing rule management table. FIG. 9 illustrates an example of the raw log information. FIG. 10A illustrates an example of a participation log management table. FIG. 10B illustrates an example of a conference log management table. In the embodiment, the temporary storage server 520 and the processing server 530 are separated from each other in order to prevent a situation in which the transmission management system 50 is unable to receive the raw log information until the processing server 530 completes processing. Furthermore, a plurality of the processing servers 530 are used such that the processing servers 530 process a plurality of pieces of the raw log information in a distributed manner so that load balancing in the processing can be realized.

The processing server 530 includes a transmitting-receiving unit 531, a processing unit 532, and a processing rule managing unit 539. The transmitting-receiving unit 531 is a function or a means implemented by a command from the CPU 201 illustrated in FIG. 6 or by the network I/F 209 illustrated in FIG. 6.

The transmitting-receiving unit 531 transmits and receives various types of data (or information) to and from other servers via the LAN 590.

The processing rule managing unit 539 includes the HD 204 and the HDD 205 illustrated in FIG. 6. The processing rule managing unit 539 includes a processing rule management table (T), in which communication status information indicating the communication status of a predetermined terminal 10 is associated with processing process information indicating the content of a processing process. The processing rule management table (T) contains, as illustrated in FIG. 8, attributes (fields) including a processing start condition indicating the communication status; a processed target table; a processed target record; and a processing process content.

The attribute "processing start condition" indicates a condition under which a processing unit starts processing according to the processing content. The processing condition differs depending on the "communication status", the "conference ID", and the "conference session ID" illustrated in FIG. 9 to be described later.

The attribute "processed target table" specifies a processed table (t1 or t2) illustrated in FIG. 10A or FIG. 10B. The attribute "processed target record" specifies a predetermined record in the processed table (t1 or t2) illustrated in FIG. 10A or FIG. 10B.

The attribute "processing process content" indicates association between a specific item in the raw log information and a specific item in the processed log information, by which the content of a processing process, which is performed for processing the raw log information into the processed log information by the processing unit 532, is indicated.

When no processed target record is contained in the processing rule management table (T), the processing unit 532 generates a new record corresponding to the table (t1 or t2).

When, at the time of processing, a certain value is already stored in an item to be processed, the processing unit 532 does not perform any processing process. When any processing start condition (the communication status) is not satisfied, the processing unit 532 does not perform any processing process. When a value indicating the start date/time or a value indicating the end date/time of every terminal 10 is not stored in the raw log information at the time of updating a conference duration, the processing unit 532 does not perform any processing process. When a value indicating a participation date/time or a value indicting a leave date/time of every terminal 10 is not stored in the raw log information at the time of updating a participation duration, the processing unit 532 does not perform any processing process.

The above processing rule is an example; therefore, different processing rules may be defined. It may be possible to perform processing according to a program indicating a rule, without using the processing rule management table (T).

The processing unit 532 is a function or a means implemented by a command from the CPU 201 illustrated in FIG. 6, and performs various processing processes for generating the processed log information, which indicates a processed log, by performing a predetermined processing on the raw log information.

As one example of the various processing processes, the processing unit 532 determines whether the raw log information is stored in the temporary storage unit 529, via the transmitting-receiving unit 531, the LAN 590, and the transmitting-receiving unit 521. The processing unit 532 searches the processing rule management table (T) with the communication status information, which indicates the communication status and which is contained in the raw log information received by the transmitting-receiving unit 531, as a search key, and extracts corresponding processing process information. The processing unit 532 generates the processed log information, which indicates a processed log, by processing the received raw log information in accordance with the processing process content indicated by the extracted processing process information.

The processing unit 532 stores the processed log information, which is generated by the processing unit 532, in a processed log storage unit 547 of the log management server 540, which will be described later, via the transmitting-receiving unit 531 and the LAN 590. The processing unit 532 stores the raw log information in a raw log storage unit 548 of the log management server 540 via the transmitting-receiving unit 531 and the LAN 590, regardless of whether or not the processing unit 532 processes the raw log information. However, when it is impossible to store the processed log information in the processed log storage unit 547 or the raw log storage unit 548, the temporary storage unit 529 returns the unprocessed raw log information to the temporary storage unit 529 of the temporary storage server 520 via the transmitting-receiving unit 531, the LAN 590, and the transmitting-receiving unit 521.

When the processing unit 532 cannot process the raw log information because there is an error (e) in the raw log information due to the absence of information on a predetermined item, the processing unit 532 stores the raw log information having the error (e) in an incomplete-raw-log storage unit 549 of the log management server 540 via the transmitting-receiving unit 531 and the LAN 590.

Log Management Server

Characteristic functions of the log management server 540 will be explained below. The log management server 540 includes a transmitting-receiving unit 541, a searching unit 542, an incomplete log excluding unit 543, the processed log storage unit 547, the raw log storage unit 548, and the incomplete-raw-log storage unit 549.

The transmitting-receiving unit 541 is a function or a means implemented by a command from the CPU 201 illustrated in FIG. 6 or by the network I/F 209 illustrated in FIG. 6. The transmitting-receiving unit 541 transmits and receives various types of data (or information) to and from other servers via the LAN 590.

The searching unit 542 searches the processed log storage unit 547 for processed log information designated by the acquisition request to extract the processed log information.

The incomplete log excluding unit 543 is a function or a means implemented by a command from the CPU 201 illustrated in FIG. 6. When receiving an acquisition request for processed log information from the external input device 40 connected to an acquisition request source terminal, the incomplete log excluding unit 543 examines whether the processed log information, which is stored in the processed log storage unit 547 and designated by the acquisition request, contains an error (E) caused by the absence of information on a predetermined item, and excludes the processed log information containing the error (E).

If pieces of the raw log information are stored in the temporary storage unit 529 in the order they are transmitted by each of the terminals 10, no error (E) is contained in the processed log information. However, in an asynchronous process performed by the temporary storage unit 529, it is not always possible that pieces of the raw log information are stored in the order they are transmitted by each of the terminals 10. Furthermore, as described in the embodiment, when a plurality of the processing servers 530 are provided, even if pieces of the raw log information are stored in the temporary storage unit 529 in the order they are transmitted by each of the terminals 10, it is not always possible that the pieces of the raw log information are subjected to a processing process in the order that they are transmitted by each of the terminals 10. Therefore, depending on a timing at which the acquisition request source terminal issues the acquisition request, processed log information containing an error (E) may be provided. Therefore, the incomplete log excluding unit 543 of the embodiment examines whether processed log information contains an error (E) before providing the processed log information to the acquisition request source terminal.

The processed log storage unit 547 stores processed log information generated by the processing unit 532 of each of the processing servers 530. The processed log information is managed as a participation log management table (t1) as illustrated in FIG. 10A and is also managed as a conference log management table (t2) as illustrated in FIG. 10B.

As illustrated in FIG. 10A, the participation log management table (t1) contains attributes including a log ID, a terminal ID, a conference ID, a conference session ID, a participation date/time, a leave date/time, a participation duration, and a leave status. Among the attributes, the attribute "log ID" indicates an ID for identifying a participant in a conference. The attribute "terminal ID" indicates, as an example of the terminal identification information, an ID for identifying a terminal that has participated in the conference. The attribute "conference ID" is an ID for identifying the conference in which the participant has participated.

The attribute "conference session ID" indicates, as an example of the management information session SEI, an ID for identifying a conference session SEIM from participation (join) in the conference to exit (leave) from the conference. For example, when a terminal 10 repeatedly participates in and leaves from the same conference at different times, a different value is assigned to each conference ID.

The attribute "participation date/time" indicates date and time at which the terminal 10 participates in the conference. The attribute "leave date/time" indicates date and time at which the terminal 10 leaves the conference. The attribute "participation duration" indicates a duration from when the terminal 10 participates in the conference to when the terminal 10 leaves the conference.

The attribute "leave status" indicates how the terminal 10 leaves the conference. The leave status "left" indicates that the terminal 10 has normally left the conference. The status "forced termination" indicates that the terminal 10 has been forced to terminate due to power discontinuity or the like. The status "in conference" indicates that the terminal 10 is participating in the conference.

The attributes and the leave statuses in the participation log management table (t1) are examples; therefore, data items or values other than the above may be included.

As illustrated in FIG. 10B, the conference log management table (t2) contains attributes including a conference ID, an organizer terminal ID, a conference start date/time, a conference end date/time, and a conference duration. Among the attributes, the attribute "conference ID" is an ID for identifying a conference. The attribute "organizer terminal ID" is an ID for identifying a terminal as a conference organizer. For example, the conference organizer indicates an organizer of a conference held by three people, and one of the people may participate in or leaves the conference after the conference starts. This person's participation in and exit from the conference are indicated in the participation log management table (t1).

The attribute "start date/time" indicates date and time at which the whole conference starts. The attribute "end date/time" indicates date and time at which the whole conference ends. The attribute "conference duration" indicates a duration of the whole conference.

The attributes in the conference log management table (t2) are examples; therefore, data items or values other than the above may be included.

In the embodiment, the processed log storage unit 547 stores therein the two tables (t1 and t2); however, it is not limited thereto and a database may be configured for each of the tables.

Referring back to FIG. 7, the raw log storage unit 548 stores the raw log information, which has been stored in the temporary storage unit 529, so as to store the raw log information as master data for a long time. Therefore, it is possible to use the raw log information to analyze a failure when any failure occurs in the transmission system 1.

When the processing unit 532 cannot process raw log information because of an error (e) caused by the absence of information on a predetermined item, the incomplete-raw-log storage unit 549 stores therein the raw log information containing the error (e).

Terminal Setting Utility Server

Characteristic functions of the terminal setting utility server 550 will be explained below. The terminal setting utility server 550 is a server that receives the acquisition request for processed log information from the acquisition request source terminal and provides the processed log information to the terminal 10. The terminal setting utility server 550 includes a transmitting-receiving unit 551 and an auxiliary functional unit 552.

The transmitting-receiving unit 551 is a function or a means implemented by a command from the CPU 201 illustrated in FIG. 6 or by the network I/F 209 illustrated in FIG. 6. The transmitting-receiving unit 551 functions to receive the acquisition request for processed log information from the acquisition request source terminal and provides the processed log information to the acquisition request source terminal. The auxiliary functional unit 552 is a function or a means implemented by a command from the CPU 201 illustrated in FIG. 6. The auxiliary functional unit 552 implements various auxiliary functions other than a function to acquire raw log information or a function to control communication.

Charge Log Generation Server

Characteristic functions of the charge log generation server 560 will be explained below. The charge log generation server 560 is a server that generates a charge log for charging a user usage fees for the transmission system 1. The charge log generation server 560 includes a transmitting-receiving unit 561 and a charge-log generating unit 562.

The transmitting-receiving unit 561 is a function or a means implemented by a command from the CPU 201 illustrated in FIG. 6 or by the network I/F 209 illustrated in FIG. 6. The transmitting-receiving unit 561 issues an acquisition request for participation duration information (pi), which indicates a participation duration determined by the "participation date/time" and the "leave date/time" that are within a predetermined period (for example from Sep. 1, 2010 until Sep. 30, 2010), for each terminal ID in the participation log management table (t1).

The transmitting-receiving unit 561 acquires desired participation duration information (pi) from the log management server 540. The transmitting-receiving unit 561 transmits charge log information (i) generated by the charge-log generating unit 562, which will be described below, to the file transfer server 570.

The charge-log generating unit 562 is a function or a means implemented by a command from the CPU 201 illustrated in FIG. 6. The charge-log generating unit 562 generates the charge log information (i), which is a comma separated values (CSV) file, based on the participation duration information (pi) acquired by the transmitting-receiving unit 561.

File Transfer Server

Characteristic functions of the file transfer server 570 will be explained below. The file transfer server 570 is connected to a file transfer server 610, which will be described later, of the charge management system 60 via the dedicated line 2x. Therefore, the transmission management system 50 can transfer an electronic file to the charge management system 60 via the dedicated line 2x without using the Internet 2i. Accordingly, it is possible to prevent falsification of charges or the like.

The file transfer server 570 includes a transmitting-receiving unit 571 and a communication control unit 572. The transmitting-receiving unit 571 is a function or a means implemented by a command from the CPU 201 illustrated in FIG. 6 or by the network I/F 209 illustrated in FIG. 6.

The transmitting-receiving unit 571 receives the participation duration information (pi) transmitted from the charge log generation server 560 and transfers the participation duration information (pi) to the file transfer server 610, which will be described later, of the charge management system 60 via the dedicated line 2x. The communication control unit 572 is a function or a means implemented by a command from the CPU 201 illustrated in FIG. 6, and controls information (data) transmission and reception performed by the transmitting-receiving unit 571.

<Charge Management System>

Figure 11:
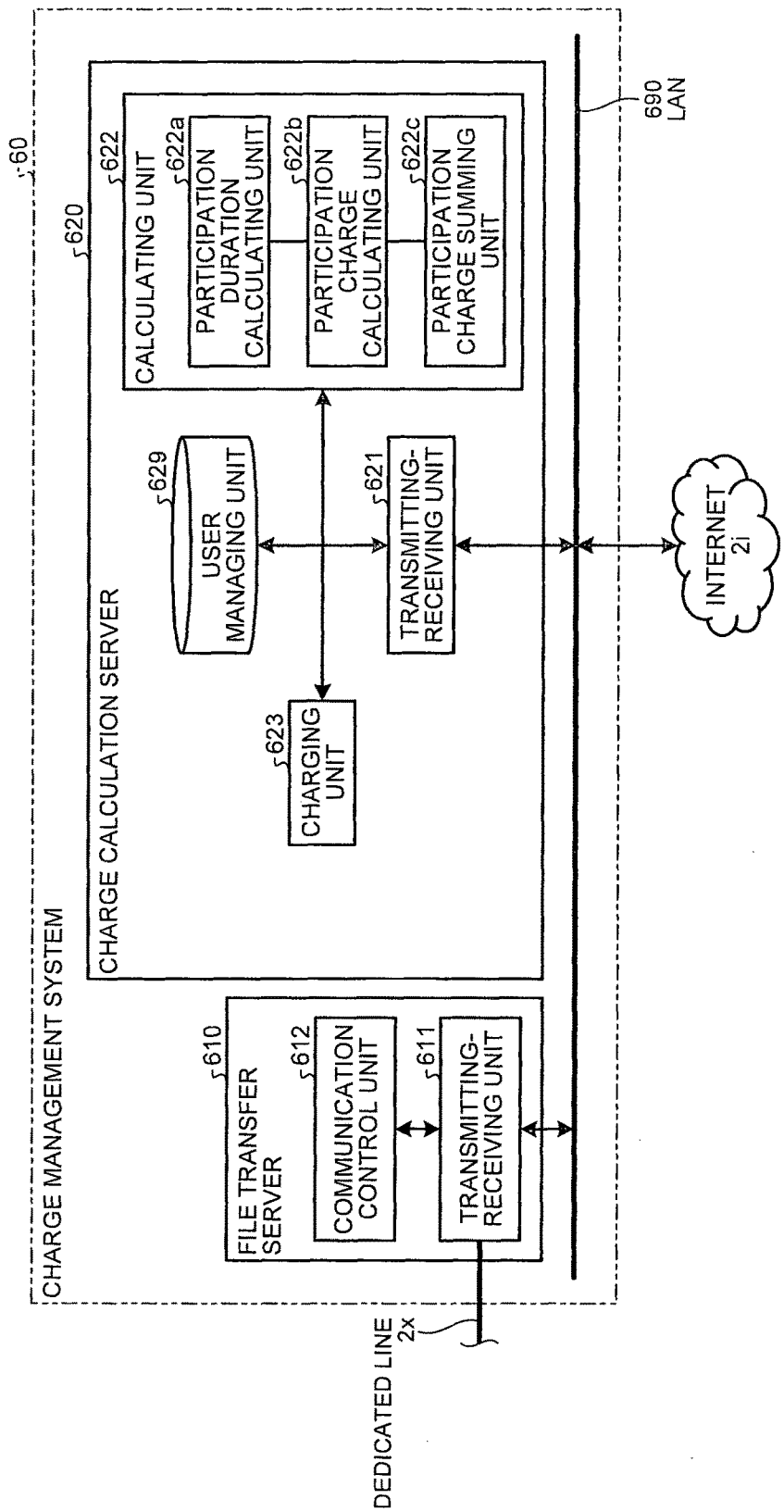
FIG. 11 is a functional block diagram of a charge management system as a characteristic part of the embodiment.

FIG. 11 is a functional block diagram of the charge management system 60 of the embodiment. As illustrated in FIG. 11, the charge management system 60 includes the file transfer server 610 and a charge calculation server 620, and the servers are communicably connected to each other via a LAN 690 and are connected to the Internet 2i via the LAN 690. The file transfer server 610 is also connected to the dedicated line 2x. Each of the servers included in the charge management system 60 has the same hardware configuration as that of the transmission management system 50 described above; therefore, the explanation thereof is omitted.

File Transfer Server

Characteristic functions of the file transfer server 610 will be explained below. The file transfer server 610 is connected to the file transfer server 570 of the transmission management system 50 via the dedicated line 2x. Therefore, the charge management system 60 can receive an electronic file from the transmission management system 50 via the dedicated line 2x without using the Internet 2i.

The file transfer server 610 includes a transmitting-receiving unit 611 and a communication control unit 612. The transmitting-receiving unit 611 is a function or a means implemented by a command from the CPU 201 illustrated in FIG. 6 or by the network I/F 209 illustrated in FIG. 6. The transmitting-receiving unit 611 receives the participation duration information (pi) as an electronic file transmitted from the file transfer server 570 via the dedicated line 2X, and transfers the participation duration information (pi) to the charge calculation server 620 via the LAN 690. The communication control unit 612 is a function or a means implemented by a command from the CPU 201 illustrated in FIG. 6, and controls information (data) transmission and reception performed by the transmitting-receiving unit 611.

Charge Calculation Server

Characteristic functions of the charge calculation server 620 will be explained below. The charge calculation server 620 includes a transmitting-receiving unit 621, a calculating unit 622, a charging unit 623, and a user managing unit 629.

The user managing unit 629 includes the HD 204 and the HDD 205 illustrated in FIG. 6. The user managing unit 629 includes a user management table (Ty). The user management table (Ty) contains, as illustrated in FIG. 12, attributes (fields) including a user's contract number, a user ID, a user name, a user's address, a user's phone number, a user's electronic mail (e-mail) address, and a terminal ID, in an associated manner. One or any combination of the user's contract number, the user ID, the user name, the user's address, the user's phone number, and the user's e-mail address is used as user identification information for identifying a user.

The attribute "contract number" is an identification number that is given when an operator of the transmission system 1 and each of users have concluded a contract for use of the transmission system 1.

The attribute "user ID" includes an identifier for identifying a user, or the like.

The attribute "user name" is information indicating a designation, a name, or the like of a user. The attribute "user's address" is information indicating domicile, residence, or the like of a user. For example, an installation place of the terminal 20 may be contained in this attribute.

The attribute "user's phone number" is information indicating a phone number of a user. The attribute "user's e-mail address" is information indicating an e-mail address of the terminal 20.

The attribute "terminal ID" is one example of the terminal identification information, and is information on the terminal IDs of all the terminals 10 used by a user. For example, a user with the user ID "a123" uses the terminals 10 with the terminal IDs "11001", "11002", and "11003".

The transmitting-receiving unit 621 is a function or a means implemented by a command from the CPU 201 illustrated in FIG. 6 or by the network I/F 209 illustrated in FIG. 6. The transmitting-receiving unit 621 transmits and receives various types of data (or information) to and from other terminals or systems via the Internet 2i and the LAN 690.

The calculating unit 622 is a function or a means implemented by a command from the CPU 201 illustrated in FIG. 6 or by the network I/F 209 illustrated in FIG. 6, and calculates a total participation charge per user. The calculating unit 622 includes a participation duration calculating unit 622a, a participation charge calculating unit 622b, and a participation charge summing unit 622c, in order to calculate the total participation charge per user.

The participation duration calculating unit 622a sums up, by referring to the participation log management table (t1) (see FIG. 10A) stored in the processed log storage unit 547 of the transmission management system 50, participation durations indicated by pieces of the participation duration information associated with the terminal IDs during a predetermined period, thereby calculating the total participation duration during the predetermined period for each of the terminals 10. For example, in FIG. 10A, a terminal ID "110001" is managed by using the log IDs "001" and "005" during a predetermined period indicated in FIG. 15A (for example, during the month of September), and corresponding participation durations of "1 hour 30 minutes 25 seconds" and "1 hour 10 minutes 10 seconds" are summed up to calculate the total participation duration of the terminal with the terminal ID "110001".

The participation charge calculating unit 622b calculates a participation charge to each of the terminals 10 during the predetermined period, on the basis of the total participation duration calculated by the participation duration calculating unit 622*a*. For example, when the operator has determined the participation charge such that the participation charge for one minute is 10 yen, and if the total participation duration for the terminal 10 calculated by the participation duration calculating unit 622*a* is 10 hours (600 minutes), the participation charge becomes 6,000 yen.

The participation charge summing unit 622*c* sums up, by referring to the user management table (Ty) (see FIG. 12) managed by the user managing unit 629, participation charges (which are calculated by the participation charge calculating unit 622*b*) to the respective terminals 10 with the terminal IDs associated with the user ID of a user who is in charge of paying the participation charges, thereby calculating the total participation charge per user. For example, in FIG. 12, because the terminal IDs "11001", "11002", and "11003" are associated with the user ID "a123", the participation charges calculated by the participation charge calculating unit 622*b* for the terminals 10 with the terminal IDs "11001", "11002", and "11003" are summed up to thereby calculate the total participation charge to the user with the user ID "a123".

The charging unit 623 is a function or a means implemented by a command from the CPU 201 illustrated in FIG. 6 or by the network I/F 209 illustrated in FIG. 6. The charging unit 623 transmits an electronic mail (e-mail) containing participation charge billing information from the transmitting-receiving unit 621 to the user's e-mail address as a destination of a notice of the participation charge via the communication network 2, by referring to the user management table (Ty) illustrated in FIG. 12. The participation charge billing information contains information on the total participation charge to all the terminals 10 belonging to each of the users during a predetermined period, a participation date/time, a demander, such as the operator, a payment method, a payment destination for the participation charge, or the like.

<<Processes or Operations in the Embodiment>>

A process performed by the transmission system 1 according to the embodiment will be explained below with reference to FIGS. 1, 7, and 13.

In FIG. 7, when the communication status changes, each of the terminals 10 transmits raw log information indicating a log of the communication status to the transmission management system 50. In FIG. 7, the communication management server 510 of the transmission management system 50 receives the raw log information transmitted from each of the terminals 10 and transmits the raw log information to the temporary storage server 520. The transmitting-receiving unit 521 of the temporary storage server 520 receives the raw log information transmitted from the communication management server 510. The temporary storage unit 529 stores therein the raw log information received by the transmitting-receiving unit 521. Therefore, the temporary storage unit 529 sequentially stores therein pieces of the raw log information. An explanation will be given of a process for generating processed log information by processing the raw log information by the transmission management system 50. The temporary storage server 520 may directly receive the raw log information from each of the terminals 10.

Figure 13:
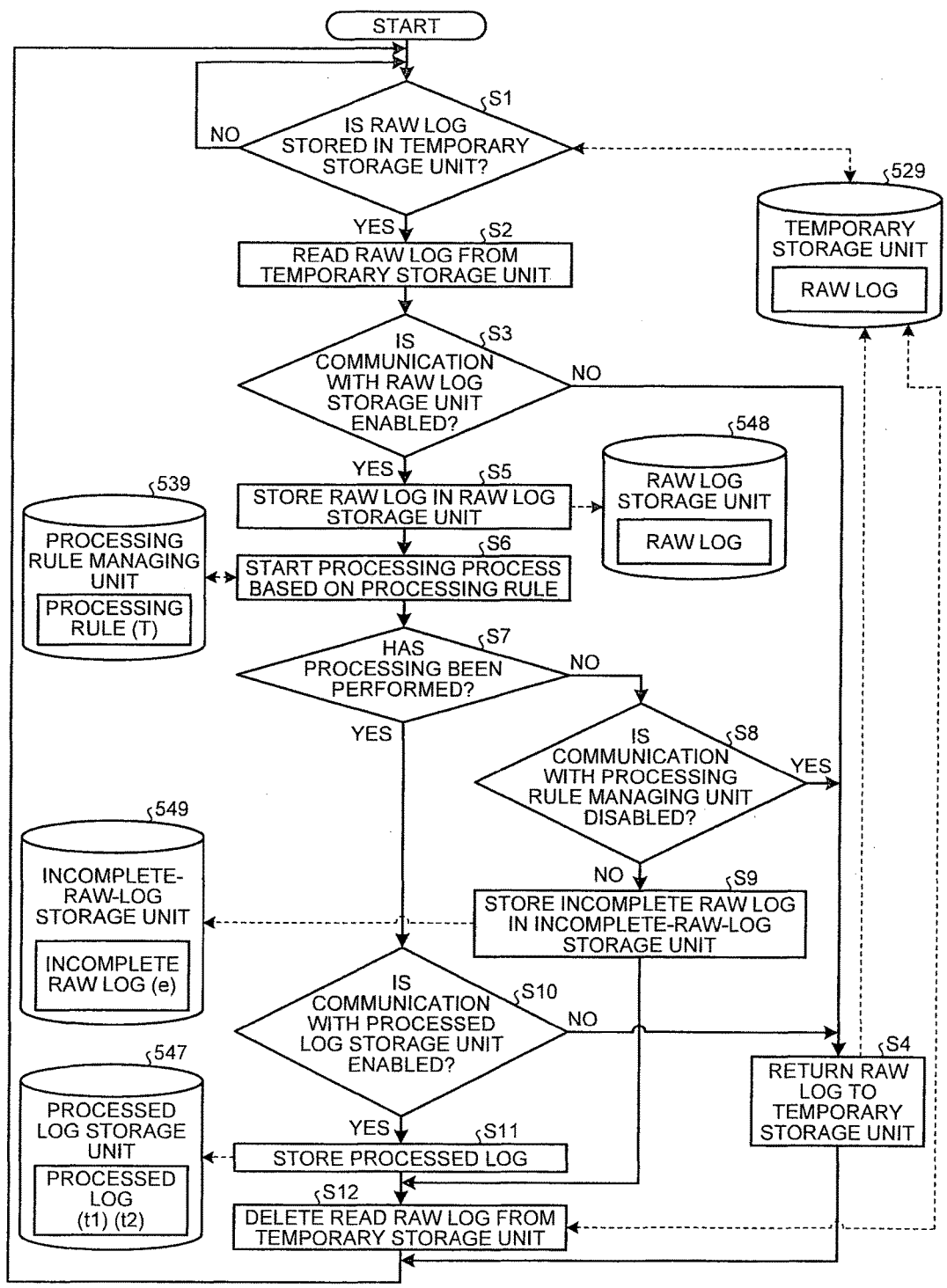
FIG. 13 is a flow diagram illustrating a process for generating processed log information by processing raw log information by the transmission management system.

FIG. 13 is a flow diagram illustrating a process for generating the processed log information by processing the raw log information by the transmission management system 50.

The processing unit 532 of the processing server 530 determines whether raw log information is stored in the temporary storage unit 529 via the LAN 590 (Step S1). When, at Step S1, determining that the raw log information is not stored (NO), the processing unit 532 continues to repeat the process at Step S1.

When determining, at Step S1, that the raw log information is stored (YES), the processing unit 532 reads the raw log information from the temporary storage unit 529 via the LAN 590 (Step S2).

The processing unit 532 determines whether communication with the raw log storage unit 548 is enabled (Step S3). When determining, at Step S3, that the communication is not enabled (NO), the processing unit 532 returns the raw log information to the temporary storage unit 529 via the LAN 590 (Step S4). On the other hand, when determining, at Step S3, that the communication is enabled (YES), the processing unit 532 stores the raw log information, as master data, in the raw log storage unit 548 of the log management server 540 via the LAN 590 (Step S5).

The processing unit 532 searches the processing rule management table (T) with the raw log information read at Step S2 as a search key to extract corresponding processing process information, and performs predetermined processing on the raw log information in accordance with the processing content indicated in the extracted processing process information to thereby generate processed log information indicating a processed log(Step S6). At Step S6, raw log information with the communication status "online" or "accept" in FIG. 9 is not contained in the processing start condition in the processing rule management table (T) illustrated in FIG. 8; therefore, such raw log information is not subjected to the processing process. In some cases, the processing unit 532 cannot normally process raw log information because of an error (e) in the raw log information.

The processing unit 532 determines whether the processing according to the processing content has been performed at Step S6 (Step S7). When determining, at Step S7, that the processing has not been performed (NO), the processing unit 532 determines whether the reason why the processing has not been performed is that a communication with the processing rule managing unit 539 is disabled (Step S8).

At Step S8, when the processing unit 532 determines that the communication is disabled (YES), the processing unit 532 returns the raw log information to the temporary storage unit 529 via the LAN 590 (similarly to Step S4). On the other hand, at Step S8, when the processing unit 532 determines that the communication is not disabled (NO), the processing unit 532 stores the raw log information containing an error (e) in the incomplete-raw-log storage unit 549 of the log management server 540 via the LAN 590 (Step S9). Therefore, the operator of the transmission system 1 can analyze the raw log information containing the error (e) and examine countermeasures against the problem.

The reason why the processing unit 532 temporarily returns the raw log information to the temporary storage unit 529 is that, even when communication with the processing rule managing unit 539 (DB) is disabled, this can be considered as a temporary DB failure rather than a communication network failure in the LAN or the like, and therefore, it may be possible to store the raw log information in the DB again after the DB is recovered. Therefore, the raw log information can be handled as a processing object again and it is possible to avoid a situation in which raw log information without an error (e) is precluded from being processed.

A case that the processing unit 532 stores the raw log information in the incomplete-raw-log storage unit 549 occurs when, for example, information on an item needed in the raw log information is absent and an error always occurs even when the processing rule managing unit 539 is repeatedly accessed. In this case, it is hardly effective to return the raw log information to the temporary storage unit 529; therefore, the raw log information containing an error (e) (an error log) is stored in the incomplete-raw-log storage unit 549.

It may be possible to notify the operator of the transmission system 1 of the occurrence of an error (e) via an e-mail or the like, instead of or together with the operation of returning the raw log information to the temporary storage unit 529 or storing the raw log information in the incomplete-raw-log storage unit 549. Accordingly, the operator can instantly recognize the occurrence of the error (e).

Referring back to the explanation of Step S7, when determining that the processing has been performed (YES), the processing unit 532 determines whether communication with the processed log storage unit 547 is enabled (Step S10). At Step S10, when determining that the communication is not enabled (NO), the processing unit 532 returns the raw log information to the temporary storage unit 529 via the LAN 590 (similarly to Step S4). On the other hand, at Step S10, when determining that the communication is enabled (YES), the processing unit 532 stores the processed log information, which is processed at Step S6, in the processed log storage unit 547 of the log management server 540 via the LAN 590 (Step S11).

After the process at Step S9 or Step S11 is completed, the processing unit 532 completely deletes the raw log information, which has been read at Step S2, from the temporary storage unit 529 of the temporary storage server 520 via the LAN 590 (Step S12).

After the process at Step S12 or Step S4 is completed, the processing unit 532 returns to Step S1 and performs the processes from Step S1 on next piece of the raw log information stored in order in the temporary storage unit 529.

With reference to FIG. 7 and FIG. 14 to FIG. 16, an explanation will be given of a process in which, when the terminal 10 issues an acquisition request for processed log information to the transmission management system 50, the transmission management system 50 provides the processed log information corresponding to the acquisition request to the acquisition request source terminal.

Figure 14:
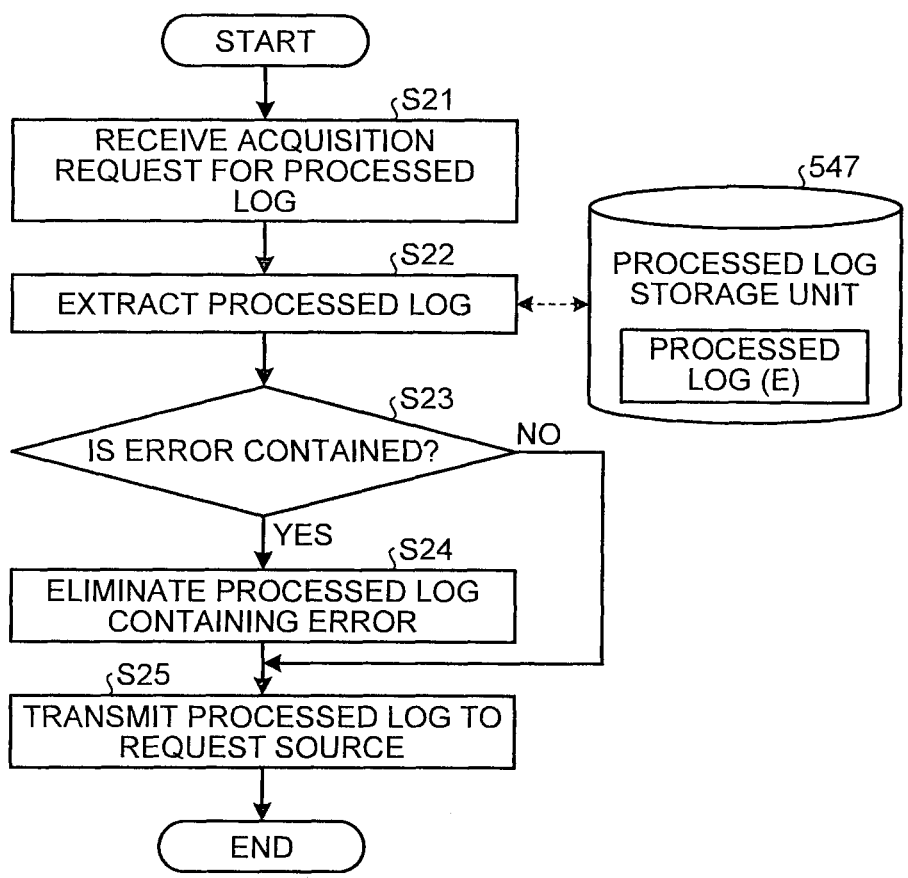
FIG. 14 is a flow diagram illustrating a process from receiving an acquisition request for processed log information from a user to providing the processed log information to the user.

FIG. 14 is a flow diagram illustrating a process from receiving an acquisition request for processed log information from a user to providing the processed log information to the user. FIG. 15A is a diagram for explaining a target period for acquiring the processed log information. FIG. 15B is a diagram for explaining search conditions for searching for raw log information. FIG. 16 illustrates an example of a screen displayed on a display of an external input device.

As illustrated in FIG. 14, the transmitting-receiving unit 551 of the terminal setting utility server 550 illustrated in FIG. 7 receives, from an acquisition request source terminal, an acquisition request as a request to acquire processed log information on communication performed by the acquisition request source terminal, and transmits the acquisition request to the log management server 540, via the communication network 2 (Step S21). The acquisition request contains, as a search key (a search parameter) used for searching for processed log information, the terminal ID of the acquisition request source terminal and a target period (for example, days, weeks, months, or years) for acquiring the processed log information.

In response to the request, the searching unit 542 of the log management server 540 searches the processed log storage unit 547 for the processed log information designated by the acquisition request to extract the corresponding processed log information (Step S22). Specifically, the searching unit 542 calculates an acquisition target range (from_date, to_date) from an acquisition target period. For example, when the acquisition target period is 2010-09, a period from 0:00 a.m. on Sep. 1, 2010 to 12:00 p.m. on Sep. 30, 2010 (0:00 a.m. on Oct. 1, 2010) becomes the acquisition target range. Therefore, the acquisition target range becomes such that "from_date"=2010-09-01 00:00:00 and "to_date"=2010-10-01 00:00:00. The searching unit 542 searches for and extracts corresponding processed log information (i1) from the participation log management table (t1) in accordance with a search condition (A, B, C, or D) illustrated in FIG. 15B, on the basis of the terminal ID of the acquisition request source terminal, "from_date", and "to_date". Subsequently, the searching unit 542 searches for and extracts corresponding processed log information (i2) from the conference log management table (t2) by using a conference ID contained in the extracted processed log information (i1) as a search key. Thereafter, the searching unit 542 merges the extracted processed log information (i1) and the processed log information (i2) to generate processed log information (I) to be provided to the request source terminal. When a plurality of pieces of the processed log information (I) are present, the searching unit 542 merges the plurality of pieces of the processed log information (I) to generate a processed log information group (IG).

A search method using the above search condition (A, B, C, or D) is explained in detail below. In the embodiment, a process is performed so that the transmission management system 50 can provide processed log information even when a period from the participation date/time to the leave date/time continues for a few months. For example, when there is raw log information indicating that the terminal 10 has participated in a conference on "2010-08-30" (Aug. 30, 2010) and has left the conference on "2010-10-01" (Oct. 1, 2010), the transmission management system 50 performs a process so that processed log information on August, September, and October can be provided. In other words, terminal IDs for which a period from the participation date/time to the leave date/time overlaps the period from_date to to_date become extracting objects. In FIG. 15A, all pieces of the raw log information (L1 to L6) become extracting objects. More specifically, the extracting objects are separated into four cases corresponding to the respective search conditions (A, B, C, and D) illustrated in FIG. 15B. By the separation, it becomes possible to limit the search range by each of the search conditions. Furthermore, by integrating the search conditions by using "OR", it becomes possible to extract desired raw log information in a short search time. The search conditions illustrated in FIG. 15B indicate the cases below.

(1) Search condition A: a case that the participation date/time is within an acquisition target month.

It is possible to limit the search range of the participation date/time to only an acquisition-request target month.

(2) Search condition B: a case that the leave date/time is within the acquisition target month.

It is possible to limit the search range of the leave date/time to the acquisition-request target month.

(3) Search condition C: a case that participation has started before the acquisition-request target month and the participation in a conference is continuing.

It is possible to limit the search range of the leave status to the "in conference". Furthermore, except for the case that the terminal 10 simultaneously participates in different conferences, the terminal 10 has only one piece of raw log information indicating "in conference".

(4) Search condition D: a case that a period from the participation date/time to the leave date/time continues for a plurality of months.

It is possible to limit the raw log information to be searched for to a condition that "the participation duration is equal to or longer than (to_date to from_date)" (in this example, equal to or longer than one month).

It has been explained that the acquisition-request target period is monthly ("2010-09"); however, even when the acquisition-request target period is daily (for example, "2010-09-01"), yearly (for example, "2010"), or arbitrarily designated (for example, "2010-09-01 00:00:00" to "2010-09-20 12:00:00"), it is possible to extract the raw log information by using the same search method. In FIG. 15B, an example is illustrated in which search is performed by using the terminal ID of one acquisition request source terminal; however, it is possible to perform the search by using the terminal IDs of a plurality of acquisition request source terminals. It is also possible to use a parameter, other than the terminal ID of the acquisition request source terminal or the acquisition target period.

An explanation is given below of a process for providing the processed log information group (IG) to the acquisition request source terminal by the transmission management system 50.

The incomplete log excluding unit 543 determines whether the processed log information group (IG) to be provided contains processed log information (I) containing an error (E) (Step S23). At Step S23, when determining that the error (E) is contained (YES), the incomplete log excluding unit 543 eliminates only the processed log information (I) containing the error (E) from the processed log information group (IG) (Step S24). Therefore, the transmission management system 50 can prevent from providing processed log information containing an error to the acquisition request source terminal.

In the embodiment, pieces of the raw log information are transmitted from the terminals 10 in order of the communication statuses "invite", "start", "join", "leave", and "end". Therefore, the incomplete log excluding unit 543 refers to items of "organizer terminal ID", "conference start date/time", "participation date/time", "leave date/time", and "conference end date/time" corresponding to the above statuses, in order reverse to the above transmission order. When an item with no information on the communication status is present prior to an item with information on the communication status, the incomplete log excluding unit 543 determines that the processed log information contains an error (E). The rule defining the above determination may be represented in an electronic file or the like managed by an external apparatus outside the incomplete log excluding unit 543.

After Step S24 or after it is determined that the error is not contained at Step S23 (NO), the transmitting-receiving unit 541 of the log management server 540 transmits the processed log information group (IG) to the terminal setting utility server 550, and the transmitting-receiving unit 551 transmits the processed log information group (IG) to the acquisition request source terminal (Step S25).

On the other hand, in connection with Step S25 described above, the display 208 of the external input device 40 connected to the acquisition request source terminal displays a "terminal setting utility" screen 1000 as illustrated in FIG. 16 by using a browser function of the external input device 40. The screen 1000 displays a terminal ID 1001 of the terminal 10, a period 1002 of a communication log contained in the processed log information, an acquisition-target-period switching menu 1003 for processed log information designated by an acquisition request, a processed log information group (IG) 1004, or the like.

Specifically, in the screen example illustrated in FIG. 16, the external input device 40 is logged in the terminal setting utility server 550 by using the terminal ID "110001" of the acquisition request source terminal. When the user issues an acquisition request for processed log information, the user selects "September, 2010" from the acquisition-target-period switching menu 1003. Accordingly, the external input device 40 issues the acquisition request for the processed log information from the acquisition request source terminal to the transmission management system 50 with the condition of the terminal ID "110001" and the acquisition target period "2010-09". Therefore, the external input device 40 displays the screen 1000 as illustrated in FIG. 16 on the display 208 of the external input device 40 based on the processed log information group (IG) transmitted from the transmission management system 50 via the request source terminal.

Every time a selection from the acquisition-target-period switching menu 1003 is changed or triangular switching buttons on the both sides of the menu 1003 (the left side is for the previous month and the right side is for the next month) are pressed, an acquisition request for processed log information corresponding to the changed acquisition target period is issued.

Meanwhile, when the processed log information indicates the conference log for a plurality of months, the log is displayed in the following manner. Specifically, three cases will be described below assuming that the participation date/time is "2010-08-30 22:00:00" (Aug. 30, 2010, 22:00) and the leave date/time is "2010-10-01 10:00:00" (Oct. 1, 2010, 10:00).

(1) Case that the communication log is displayed as it is.

(1-1) The communication log in August is displayed such that the participation date/time is "2010-08-30 22:00:00" and the leave date/time is "2010-10-01 10:00:00".

(1-2) The communication log in September is displayed such that the participation date/time is "2010-08-30 22:00:00" and the leave date/time is "2010-10-01 10:00:00".

(1-3) The communication log in October is displayed such that the participation date/time is "2010-08-30 22:00:00" and the leave date/time is "2010-10-01 10:00:00".

(2) Case that a part continuing to a next month is trimmed (deleted) at the boundary between the months but all the participation date/time and the leave date/time are displayed.

The trimming process may be performed by the auxiliary functional unit 552 of the terminal setting utility server 550 or by the searching unit 542 of the log management server 540.

(2-1) The communication log in August is displayed such that the participation date/time is "2010-08-30 22:00:00" and the leave date/time is "2010-08-31 23:59:59".

(2-2) The communication log in September is displayed such that the participation date/time is "2010-09-01 00:00:00" and the leave date/time is "2010-09-30 23:59:59".

(2-3) The communication log in October is displayed such that the participation date/time is "2010-10-01 00:00:00" and the leave date/time is "2010-10-01 10:00:00".

(3) Case that a part continuing to a next month is trimmed (deleted) at the boundary between the months and the participation date/time or the leave date/time is not displayed (a case that a part continuing to the next month is displayed as "<--", or "-->").

The trimming process may be performed by the auxiliary functional unit 552 of the terminal setting utility server 550 or by the searching unit 542 of the log management server 540.

(3-1) The communication log in August is displayed such that the participation date/time is "2010-08-30 22:00:00" and the leave date/time is "—>".

(3-2) The communication log in September is displayed such that the participation date/time is "<--" and the leave date/time is "-->".

(3-3) The communication log in October is displayed such that the participation date/time is "2010-08-30 22:00:00" and the leave date/time is "2010-10-01 10:00:00".

By receiving a communication log by a message queue (a messaging system for asynchronous communication), a communication log transmission side need not wait for the completion of a log shaping process. Therefore, it is possible to prevent interference to a primary process, such as a communication control process.

Figure 17:
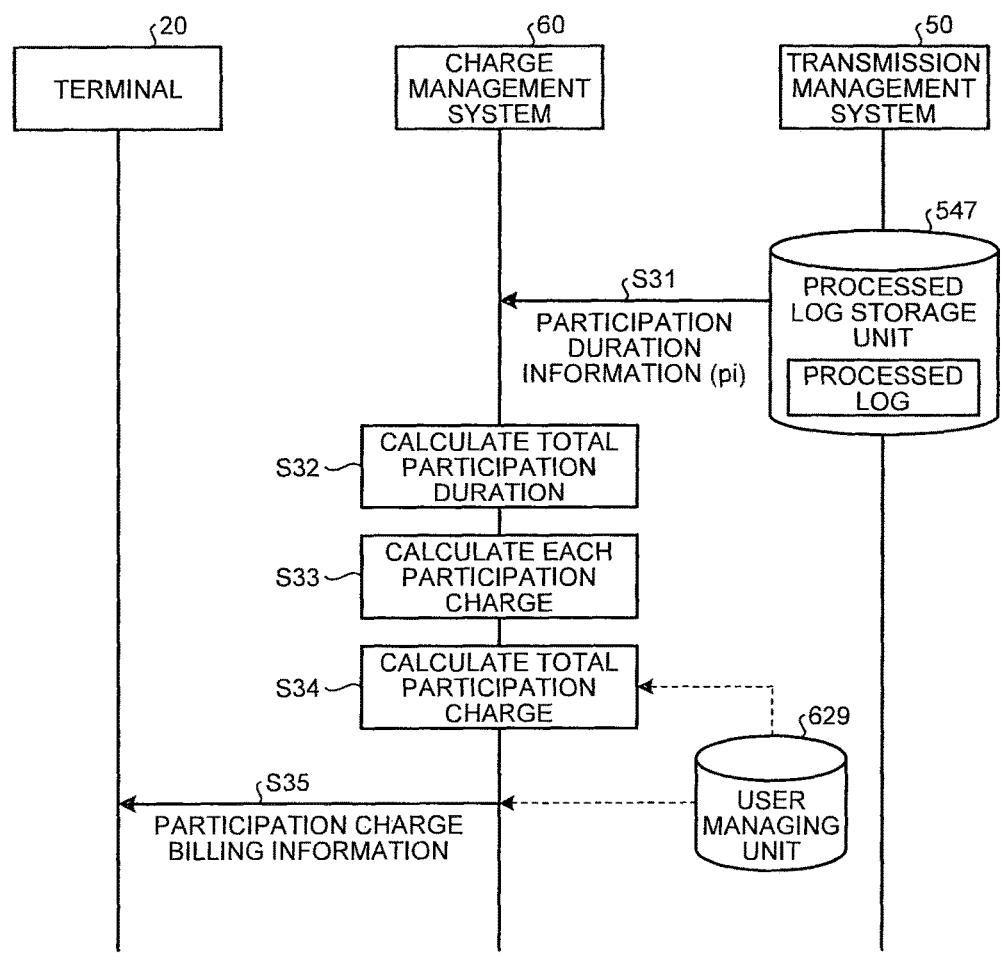
FIG. 17 is a sequence diagram illustrating a charging method.

With reference to FIG. 11 and FIG. 17 and FIG. 18, a case is explained that the operator of the transmission system 1 charges the user of the transmission system 1a participation charge for participation of the user in a telephone conference using the transmission system 1. FIG. 17 is a sequence diagram illustrating a charging method. FIG. 18 is a schematic diagram illustrating sets of participation charges.

The user in this example is a user as a unit of payment for the participation charge, rather than a user of each of the terminals 10. In the example in FIG. 1, it is assumed that the four business offices, such as the Tokyo office, the Osaka office, the New York office, and the Washington D.C. office, are regarded as users as the unit of payment and the users separately pay the participation charges.

The transmission management system 50 transmits the terminal. ID and the participation duration information (pi) to the charge management system 60 via the dedicated line 2x(Step S31). Accordingly, the charge management system 60 receives the participation duration information (pi) on each of the terminals 10. Specifically, the transmitting-receiving unit 621 of the charge calculation server 620 in the charge management system 60 receives the terminal ID and the participation duration information (pi) from the processed log storage unit 547 of the log management server 540 in the transmission management system 50, via the transmitting-receiving unit 541, the LAN 590, the transmitting-receiving unit 571, the dedicated line 2x, the transmitting-receiving unit 611, the LAN 690, and the transmitting-receiving unit 621 in this order. It may be possible to send a transmission request for the participation duration information (pi) from the charge management system 60 side to the transmission management system 50 or to cause the transmission management system 50 to periodically (for example, on the first day of each month) transmit the participation duration information (pi) to the charge management system 60.

The participation duration calculating unit 622a sums up the participation durations indicated by pieces of the participation duration information associated with the respective terminal IDs, on the basis of the participation duration information (pi) acquired from the log management server 540 during a predetermined period (for example, during one day), thereby calculating the total participation duration during the predetermined period for each of the terminals 10 (Step S32). The transmitting-receiving unit 621 may acquire the participation duration information (pi) from the log management server 540 via the LAN 690, the Internet 2i, the LAN 590, and the transmitting-receiving unit 541 in this order.

The participation charge calculating unit 622b of the calculating unit 622 calculates the participation charge to each of the terminals 10 during the predetermined period, on the basis of the total participation duration calculated at Step S31 (Step S33). For example, when the operator has determined the participation charge such that the participation charge for one minute is 10 yen, and if the total participation duration for an arbitrary terminal 10 calculated at Step S31 is 10 hours (600 minutes), the participation charge becomes 6,000 yen.

The participation charge summing unit 622c of the calculating unit 622 sums up, by referring to the user management table (Ty) (see FIG. 12) managed by the user managing unit 629, the participation charges (which are calculated at Step S33) to the respective terminals 10 with the terminal IDs associated with the user ID of a user who is in charge of paying the participation charges, thereby calculating the total participation charge per user (Step S34). For example, in FIG. 12, because the terminal IDs "11001", "11002", and "11003" are associated with the user ID "a123", the participation charges calculated at Step S32 for the terminals with the terminal IDs "11001", "11002", and "11003" are summed up to thereby calculate the total participation charge to the user with the user ID "a123".

As described above, as illustrated in FIG. 18, the charge management system 60 can calculate the total participation charge per user.

The charging unit 623 of the charge management system 60 transmits an e-mail containing participation charge billing information to the user's e-mail address as a destination of a notice of the participation charge, by referring to the user management table (Ty) illustrated in FIG. 12 (Step S35). The participation charge billing information contains the total participation charge per user as illustrated in FIG. 18, so that each of the users can recognize the total participation charge needed to be paid.

Advantageous Effects of the Embodiment

As described above, according to one embodiment, the total participation charge per user is calculated from the total participation duration for a conversation. Therefore, the operator of the transmission system 1 can charge each of the users a charge corresponding to a duration during which each of the users (who conduct conversations) has participated in the conversation. As a result, it is possible to fairly charge the users charges.

The transmission management system 50 generates and stores processed log information before receiving, from each of the terminals 10, an acquisition request for the processed log information on the communication performed by each of the terminals 10. Therefore, when receiving the acquisition request for the processed log information from each of the terminals 10, the transmission management system 50 can instantly provide the processed log information to the terminal 10 being the request source.

In some cases, the conference session SEIM continues to next or later months (in this example, to September) among, for example, August, September, and October. In this case, when the user issues an acquisition request for processed log information on September, the transmission management system 50 cannot retrieve corresponding raw log information by searching for raw log information with the communication status "join" or "leave" from among pieces of information on September. Therefore, the transmission management system 50 needs to search for pieces of raw log information with the communication status "join" indicating that the communication has started before September, and thereafter identify one piece of raw log information associated with a predetermined conference ID (x). Subsequently, the transmission management system 50 needs to search for pieces of raw log information with the communication status "leave" indicating that the communication has ended after September, and thereafter identify one piece of raw log information associated with the same conference ID as the conference ID (x). Therefore, it takes a long time for the transmission management system 50 to search for the raw log information, leading to an increase in time to generate the processed log information. By contrast, according to one embodiment, because the search method as illustrated in FIGS. 15A and 15B is applied, it is possible to shorten the search time, enabling to quickly generate the processed log information.

Other Embodiment

The processing unit 532 may add an attribute "error flag" to the participation log management table (t1) illustrated in FIG. 10A in order to generate a participation log management table (t11) as illustrated in FIG. 19A. Similarly, the processing unit 532 may add an attribute "error flag" to the conference log management table (t2) illustrated in FIG. 10B in order to generate a conference log management table (t12) as illustrated in FIG. 19B. In this case, the incomplete log excluding unit 543 illustrated in FIG. 7 determines whether processed log information stored in the processed log storage unit 547 contains an error (E), before receiving an acquisition request for the processed log information from the terminal 10. When there is no error (E), "0" is input in the attribute "error flag" as search result information, and, when there is an error (E), "1" is input as the search result information. Therefore, the communication management server 510 can receive the processed log information from the log management server 540 while eliminating processed log information with "error flag" of "1". Furthermore, the incomplete log excluding unit 543 need not determine whether processed log information contains an error after receiving an acquisition request for the processed log information from an acquisition request source terminal. Therefore, it becomes possible to instantly provide the processed log information to the acquisition request source terminal. In this example, "0" indicates normal and "1" indicates an error (abnormality); however, it is not limited thereto. It is possible to use any information, such as "true" or "false", "normal" or "defect", that enables to determine whether there is an error.

It is also possible to, for example, provide a plurality of assemblies consisted of the temporary storage unit 529, the processing unit 532, and the processed log storage unit 547 illustrated in FIG. 7 in the transmission management system 50, and sequentially transfer pieces of the raw log information and the processed log information to the temporary storage units 529 in the different assemblies by using a message relay in order to generate a plurality of types of processed log information from one type of the raw log information.

The communication management server 510, the temporary storage server 520, the processing servers 530, the log management server 540, and the terminal setting utility server 550 are explained as separate servers; however, it is not limited thereto. For example, the transmission management system 50 may have one or a plurality of functions as a collection of any functions of the above servers.

The relay device 30, the external input device 40, the transmission management system 50, the charge management system 60, the program providing system 90, and the maintenance system 100 may be configured as a single computer or a plurality of computers to which the units (the functions or the units) are separately allocated in any manner. When the program providing system 90 is configured as a single computer, a program to be transmitted by the program providing system 90 may be transmitted by being divided into a plurality of modules, or may be transmitted as it is. When the program providing system 90 is configured as a plurality of computers, it may be possible to transmit the program from each of the computers while the program is divided into a plurality of modules.

It is possible to construct a program product including a recording medium that collectively or separately records therein programs of the relay device 30, the external input device 40, the transmission management system 50, the charge management system 60, the program providing system 90, and the maintenance system 100; the HD 204 that collectively or separately stores therein the programs; or the program providing system 90 including the HD 204, so that the program product can be used to provide the programs to users inside or outside of a certain country.

In the above embodiments, the teleconference system has been explained as an example of the transmission system 1; however, it is not limited thereto. For example, a telephone system, such as an Internet Protocol (IP) phone or an Internet phone, may be used. Furthermore, the transmission system 1 may be a car navigation system. In this case, for example, one of the terminals 10 functions as a car navigation device equipped in a vehicle and another one of the terminals 10 functions as a car navigation device equipped in a management terminal or a management server in a management center that manages car navigation or a car navigation device equipped in a different vehicle. Furthermore, the log during a predetermined period may be a communication log or a call log of a mobile phone.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The invention claimed is:

1. A non-transitory system, comprising:
a memory configured to store user identifiers identifying a plurality of users and terminal identifiers identifying a plurality of transmission terminals, each user identifier being associated with a plurality of the terminal identifiers identifying a corresponding plurality of transmission terminals of a user of the plurality of users; and
processing circuitry configured to calculate a participation charge to each of the transmission terminals based on a total participation duration in which each of the transmission terminals has participated in a session during a predetermined period, and calculate a total participation charge to each of the users by summing up, for each user, the participation charges to the plurality of transmission terminals of the user during the predetermined period and specified by the plurality of terminal identifiers associated with the user identifier of the user, by referring to the memory, wherein the processing circuitry calculates the total participation duration by summing up participation durations, each indicated by a piece of participation duration information, the piece of participation duration information indicating a participation duration in which the each of the transmission terminals has participated in the session, the participation charge is different than, and billed separately from, a communication charge, which is a packet communication charge charged by a telecommunications company, each transmission terminal can repeatedly participate in and leave the session at different times before the session terminates, each transmission terminal participating in the session can leave the session before the session terminates and the memory stores a leave status for each terminal participating in the session, the leave status indicating a manner in which each terminal that participated in the session left the session, the memory stores a participation date and time, and a leave date and time for each transmission terminal participating in the session, the total participation duration includes a sum of participation durations during which each transmission terminal has participated in a same conference when each transmission terminal repeatedly participates in and leave the same conference at different times, the processing circuitry calculates the participation durations based on the participation date and times and the leave date and times of the transmission terminals participating in the session, and the processing circuitry is configured to display on a display, in response to a request by a terminal, information from the memory, the information including a participation duration and the leave status for each session participated in by the terminal in a given time period.

2. The system according to claim 1, wherein
the memory stores electronic mail addresses of the users identified by the user identifiers, in association with the user identifiers, and the processing circuitry is further configured to transmit an electronic mail as a notice of the total participation charge to an electronic mail address associated with the user identifiers corresponding to a user in charge of payment of the total participation charge, by referring to the memory.

3. The system of claim 1, wherein each of the plurality of transmission terminals is configured to receive and transmit content data including at least image data and video data.

4. The system of claim 3, wherein a video conference is established between the plurality of transmission terminals by transmitting and receiving the content data.

5. The system of claim 4, wherein the processing circuitry is configured to calculate the participation charge for each transmission terminal based on the total participation duration, which is a duration measured from when the terminal starts to participate in the video conference to when the terminal leaves the video conference.

6. The system of claim 1, wherein the participation management memory further stores a session identifier for each transmission terminal participating in the session.

7. The system of claim 1, wherein the processing circuitry further stores the calculated participation duration in the participation log management memory.

8. A method for a system that includes a memory configured to store user identifiers identifying a plurality of users and terminal identifiers identifying a plurality of transmission terminals, each user identifier being associated with a plurality of the terminal identifiers identifying a corresponding plurality of transmission terminals of a user of the plurality of users, the charge management method comprising:

calculating, by a processing circuit, a participation charge to each of the transmission terminals based on a total participation duration in which each of the transmission terminals has participated in a session during a predetermined period; and calculating a total participation charge to each of the users by summing up, for each user, the participation charges to the plurality of transmission terminals of the user during the predetermined time period and specified by the plurality of terminal identifiers associated with the user identifier of the user, by referring to the memory, wherein the calculating step comprises calculating the total participation duration by summing up participation durations, each indicated by a piece of participation duration information, the piece of participation duration information indicating a participation duration in which the each of the transmission terminals has participated in the session, the participation charge is different than, and billed separately from, a communication charge, which is a packet communication charge charged by a telecommunications company, each transmission terminal can repeatedly participate in and leave the session at different times before the session terminates, each transmission terminal participating in the session can leave the session before the session terminates and the memory stores a leave status for each terminal participating in the session, the leave status indicating a manner in which each terminal that participated in the session left the session, the memory stores a participation date and time, and a leave date and time for each transmission terminal participating in the session, the total participation duration includes a sum of participation durations during which each transmission terminal has participated in a same conference when each transmission terminal repeatedly participates in and leave the same conference at different times, the calculating step comprises calculating the participation durations based on the participation date and times and the leave date and times of the transmission terminals participating in the session, and the method further includes displaying on a display, in response to a request by a terminal, information from the memory, the information including a participation duration and the leave status for each session participated in by the terminal in a given time period.

9. The method according to claim 8, further comprising transmitting an electronic mail as a notice of the total participation charge to an electronic mail address associated with the user identifier corresponding to a user in charge of payment of the total participation charge.

10. A non-transitory computer-readable recording medium with an executable program stored thereon and executed by a computer of a system that includes a memory configured to store user identifiers identifying a plurality of users and terminal identifiers identifying a plurality of transmission terminals, each user identifier being associated with a plurality of the terminal identifiers identifying a corresponding plurality of transmission terminals of a user of the plurality of users, wherein the program instructs the computer to perform a method comprising:

calculating a participation charge to each of the transmission terminals based on a total participation duration in which each of the transmission terminals has participated in a session during a predetermined period; and calculating a total participation charge to each of the users by summing up, for each user, the participation charges to the plurality of transmission terminals of the user during the predetermined period and specified by the plurality of terminal identifiers associated with the user identifier of the user, by referring to the memory, wherein the calculating step comprises calculating the total participation duration by summing up participation durations, each indicated by a piece of participation duration information, the piece of participation duration information indicating a participation duration in which the each of the transmission terminals has participated in the session, the participation charge is different than, and billed separately from, a communication charge, which is a packet communication charge charged by a telecommunications company, each transmission terminal can repeatedly participate in and leave the session at different times before the session terminates, each transmission terminal participating in the session can leave the session before the session terminates and the memory stores a leave status for each terminal participating in the session, the leave status indicating a manner in which each terminal that participated in the session left the session, the memory stores a participation date and time, and a leave date and time for each transmission terminal participating in the session, the total participation duration includes a sum of participation durations during which each transmission terminal has participated in a same conference when each transmission terminal repeatedly participates in and leave the same conference at different times, the calculating step comprises calculating the participation durations based on the participation date and times and the leave date and times of the transmission terminals participating in the session, and the method further includes displaying on a display, in response to a request by a terminal, information from the memory, the information including a participation duration and the leave status for each session participated in by the terminal in a given time period.

11. The method of claim 8, wherein each of the plurality of transmission terminals is configured to receive and transmit content data including at least image data and video data.

12. The method of claim 11, wherein a video conference is established between the plurality of transmission terminals by transmitting and receiving the content data.

13. The method of claim 12, wherein the calculating step comprises calculating the participation charge for each transmission terminal based on the total participation duration, which is a duration measured from when the transmission terminal starts to participate in the video conference to when the transmission terminal leaves the video conference.

* * * * *